(12) United States Patent
Koga et al.

(10) Patent No.: US 10,344,724 B2
(45) Date of Patent: Jul. 9, 2019

(54) HIGH-PRESSURE PUMP

(71) Applicant: DENSO CORPORATION, Kariya, Aichi-pref. (JP)

(72) Inventors: Tatsuro Koga, Kariya (JP); Noriya Matsumoto, Kariya (JP); Seiji Tanizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 19 days.

(21) Appl. No.: 15/580,322

(22) PCT Filed: May 10, 2016

(86) PCT No.: PCT/JP2016/002290
§ 371 (c)(1),
(2) Date: Dec. 7, 2017

(87) PCT Pub. No.: WO2016/199344
PCT Pub. Date: Dec. 15, 2016

(65) Prior Publication Data
US 2018/0163682 A1    Jun. 14, 2018

(30) Foreign Application Priority Data

Jun. 10, 2015   (JP) ................................ 2015-117497

(51) Int. Cl.
*F02M 37/06*   (2006.01)
*F02M 63/00*   (2006.01)
(Continued)

(52) U.S. Cl.
CPC .......... *F02M 59/462* (2013.01); *F02M 37/06* (2013.01); *F02M 59/46* (2013.01);
(Continued)

(58) Field of Classification Search
CPC ...... F02M 59/462; F02M 59/46; F02M 59/34; F02M 59/361; F02M 69/54; F02M 69/52;
(Continued)

(56) References Cited

U.S. PATENT DOCUMENTS

| 2008/0056914 A1* | 3/2008 | Usui ...................... F02M 55/04 |
| | | 417/307 |
| 2011/0126804 A1* | 6/2011 | Lucas .................. F02M 59/366 |
| | | 123/456 |

(Continued)

FOREIGN PATENT DOCUMENTS

| JP | H05-66378 | 9/1993 |
| JP | 2012-052464 | 3/2012 |
| JP | 5501272 | 5/2014 |
| JP | 2015-075049 | 4/2015 |
| JP | 2015075049 | * 4/2015 |

OTHER PUBLICATIONS

International Search Report for PCT/JP2016/002290, dated Jul. 5, 2016, 4 pages.

(Continued)

*Primary Examiner* — George C Jin
(74) *Attorney, Agent, or Firm* — Nixon & Vanderhye PC

(57) ABSTRACT

In a high-pressure pump, a relief valve main body has a rod shape. A relief valve seat portion is integrated with an end of a relief valve main body so as to be capable of contacting a relief valve seat. The relief valve main body is inserted into a guide hole portion of a support portion. The guide hole portion slidably supports an outer wall of the relief valve main body so as to guide a reciprocating movement of the relief valve main body in the axial direction. A fuel guide portion is provided at an end portion of the relief valve main body facing the pressurizing chamber and can guide a flow of the fuel in a direction radially outward of the relief valve main body on the way from the pressurizing chamber toward the valve seat portion.

13 Claims, 9 Drawing Sheets

(51) Int. Cl.
*F02M 59/46* (2006.01)
*F02M 69/54* (2006.01)
*F16K 17/08* (2006.01)
*F02M 55/02* (2006.01)

(52) U.S. Cl.
CPC .......... *F02M 63/005* (2013.01); *F02M 69/54* (2013.01); *F16K 17/085* (2013.01); *F02M 55/025* (2013.01); *F02M 2200/30* (2013.01)

(58) Field of Classification Search
CPC .... F02M 37/06; F02M 37/046; F02M 63/005; F02M 55/04; F16K 17/085; F16K 17/003; F04B 1/0452; F04B 53/1002; F04B 53/1087; F04B 49/22
See application file for complete search history.

(56) References Cited

U.S. PATENT DOCUMENTS

| | | | |
|---|---|---|---|
| 2011/0129363 A1* | 6/2011 | Sakai | F02M 59/34 417/289 |
| 2012/0227711 A1 | 9/2012 | Saito | |
| 2015/0078922 A1* | 3/2015 | Oikawa | F04B 1/0452 417/213 |

OTHER PUBLICATIONS

Koga, et al., U.S. Appl. No. 15/580,332, filed Dec. 7, 2017 (49 pages).

* cited by examiner

PASSAGE OF FUEL

FLOW OF FUEL

HIGH-PRESSURE PUMP

CROSS REFERENCE TO RELATED APPLICATION

This application is the U.S. national phase of International Application No. PCT/JP2016/002290 filed on May 10, 2016, which designated the U.S. and claims priority to Japanese Patent Application No. 2015-117497 filed on Jun. 10, 2015, the entire contents of each of which are hereby incorporated by reference.

TECHNICAL FIELD

The present disclosure relates to a high-pressure pump that pressurizes and discharges a fuel.

BACKGROUND ART

Up to now, a high-pressure pump has been known, in which a discharge valve and a relief valve are integrated with each other in a discharge passage through which a fuel pressurized in a pressurizing chamber flows. For example, in a high-pressure pump disclosed in Patent Literature 1, a spherical valve body is used as a valve body of the relief valve.

The high-pressure pump of Patent Literature 1 includes a holder that holds the valve body of the relief valve and an urging member that urges the valve body toward a valve seat through the holder. In this case, the movement of the valve body and the holder is not guided by another member, and can move relatively freely in a space between the pressurizing chamber and the valve seat. The fuel discharged from the pressurizing chamber of the high-pressure pump flows around the valve body and the holder to be discharged to the outside of the high-pressure pump. For that reason, the valve body and the holder may move or vibrate due to a flow of the fuel. If the valve body moves or vibrates in a state where the valve body is in contact with the valve seat, the valve seat or the valve body may be worn. If the valve seat or the valve body wears, a valve opening pressure of the relief valve may change over time.

PRIOR ART LITERATURE

Patent Literature

Patent Literature 1: JP 5501272 B

SUMMARY

In the high-pressure pump of Patent Literature 1, for example, if the valve body is formed in a rod shape and an outer wall of the valve body is slidably supported on an inner wall of a hole portion so as to guide a reciprocating movement of the valve body in an axial direction, it is conceivable that wear of the valve seat or the valve body described above can be reduced. However, in such a configuration, the fuel discharged from the pressurizing chamber and flowing through the discharge passage from the pressurizing chamber toward the outside of the high-pressure pump may enter a space between the inner wall of the hole portion and the outer wall of the valve body. When the fuel enters the space between the hole portion and the valve body, air bubbles are generated between the hole portion and the valve body during reciprocating movement of the valve body, the air bubbles collapse, cavitation erosion may occur in the inner wall of the hole portion or the outer wall of the valve body, and the hole portion or the valve body may be eroded. As a result, backlash between the hole portion and the valve body increases, and the valve body moves or vibrates in a state where the valve body contacts the valve seat, so that the valve seat or the valve body may be worn. As described above, even with the configuration considered as a countermeasure against the problem of Patent Literature 1, the same problem as that of Patent Literature 1 may arise after a long period of time.

The present disclosure has been made in view of the above-described points, and an object of the present disclosure is to provide a high-pressure pump capable of reducing a change over time in valve opening pressure of a relief valve member over a long period of time.

According to an aspect of the present disclosure, a high-pressure pump includes a pump body, a valve seat portion, a discharge valve member, a discharge valve urging member, a relief valve member, a relief valve urging member and a support portion. The pump body includes a pressurizing chamber that pressurizes a fuel, and a discharge passage through which the fuel pressurized and discharged by the pressurizing chamber flows. The valve seat portion includes a valve seat main body, a discharge valve passage, a relief valve passage, a discharge valve seat and a relief valve seat.

The valve seat main body is provided in the discharge passage to partition the discharge passage into a first space positioned between the valve seat main body and the pressurizing chamber and a second space positioned on an opposite side of the valve seat main body from the pressurizing chamber. The discharge valve passage is provided in the valve seat main body and connects the first space and the second space. The relief valve passage which is provided in the valve seat main body and connects the second space and the first space without communicating with the discharge valve passage. The discharge valve seat has an annular shape and surrounds an opening of the discharge valve passage of the valve seat main body in the second space. The relief valve seat has an annular shape and surrounds an opening of the relieve valve passage of the valve seat main body in the first space. The discharge valve member is provided in the second space to be capable of contacting the discharge valve seat, and the discharge valve member opens or closes the discharge valve passage when separating from the discharge valve seat or contacting the discharge valve seat. The discharge valve urging member urges the discharge valve member toward the discharge valve seat. The relief valve member includes a relief valve main body and a relief valve seat portion.

The relief valve main body has a rod shape. The relief valve seat portion is integrated with a first end of the relief valve main body in the axial direction and is capable of contacting the relief valve seat. The relief valve member is provided in the first space to be reciprocable in an axial direction. The relief valve urging member urges the relief valve member toward the relief valve seat. The support portion includes a support main body and a guide hole portion.

The support main body is provided in the first space. The guide hole portion connects a surface of the support main body facing the pressurizing chamber and a surface of the support main body facing the valve seat portion. The relief valve main body is inserted into the guide hole portion. The support portion slidably supporting an outer wall of the relief valve main body by the guide hole portion to guide reciprocating movement of the relief valve member in the axial direction. The fuel guide portion is provided on an end portion of the relief valve main body facing the pressurizing chamber and is capable of guiding a flow of the fuel in a direction radially outward of the relief valve main body on the way from the pressurizing chamber to the valve seat portion.

In the above aspect of the present disclosure, the guide hole portion of the support portion slidably supports the outer wall of the relief valve main body so as to guide the reciprocating movement of the relief valve member in the axial direction. For that reason, even if the fuel discharged from the pressurizing chamber in the high-pressure pump flows around the relief valve member, the relief valve seat portion of the relief valve member is prevented from relatively moving or oscillating in the radial direction with respect to the relief valve seat. As a result, wear of the relief valve seat or the relief valve seat portion can be reduced. Therefore, a change over time in the valve opening pressure of the relief valve member can be reduced.

In the above aspect of the present disclosure, for example, when the fuel is discharged from the pressurizing chamber, the fuel passing by the fuel guide portion from the pressurizing chamber toward the valve seat portion flows in the direction radially outward of the relief valve main body. For that reason, the fuel can be prevented from entering a space between the inner wall of the guide hole portion and the outer wall of the relief valve main body. As a result, cavitation erosion between the guide hole portion and the relief valve main body can be reduced, and the guide hole portion or the relief valve main body can be prevented from being eroded. As a result, the backlash between the guide hole portion and the relief valve main body can be prevented from increasing even after a long period of time, and the relief valve seat or the relief valve seat portion can be prevented from being worn. As a result, according to the present disclosure, a change over time in the valve opening pressure of the relief valve member can be reduced for a long period of time.

DESCRIPTION OF EMBODIMENTS

Figure 1:
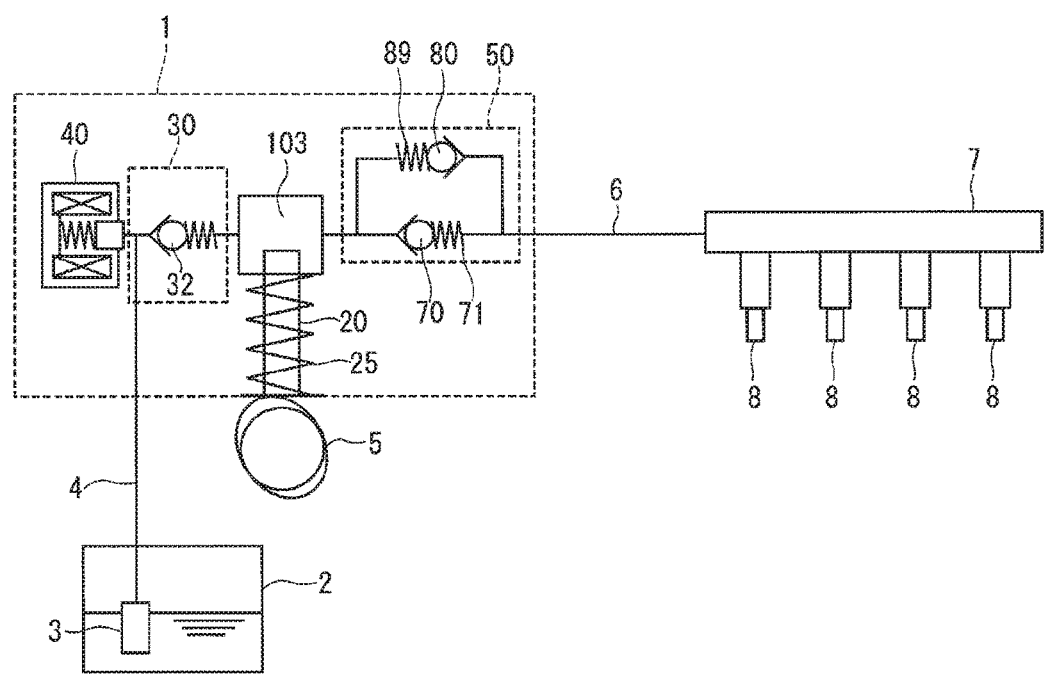
FIG. 1 is a schematic diagram showing a high-pressure pump according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
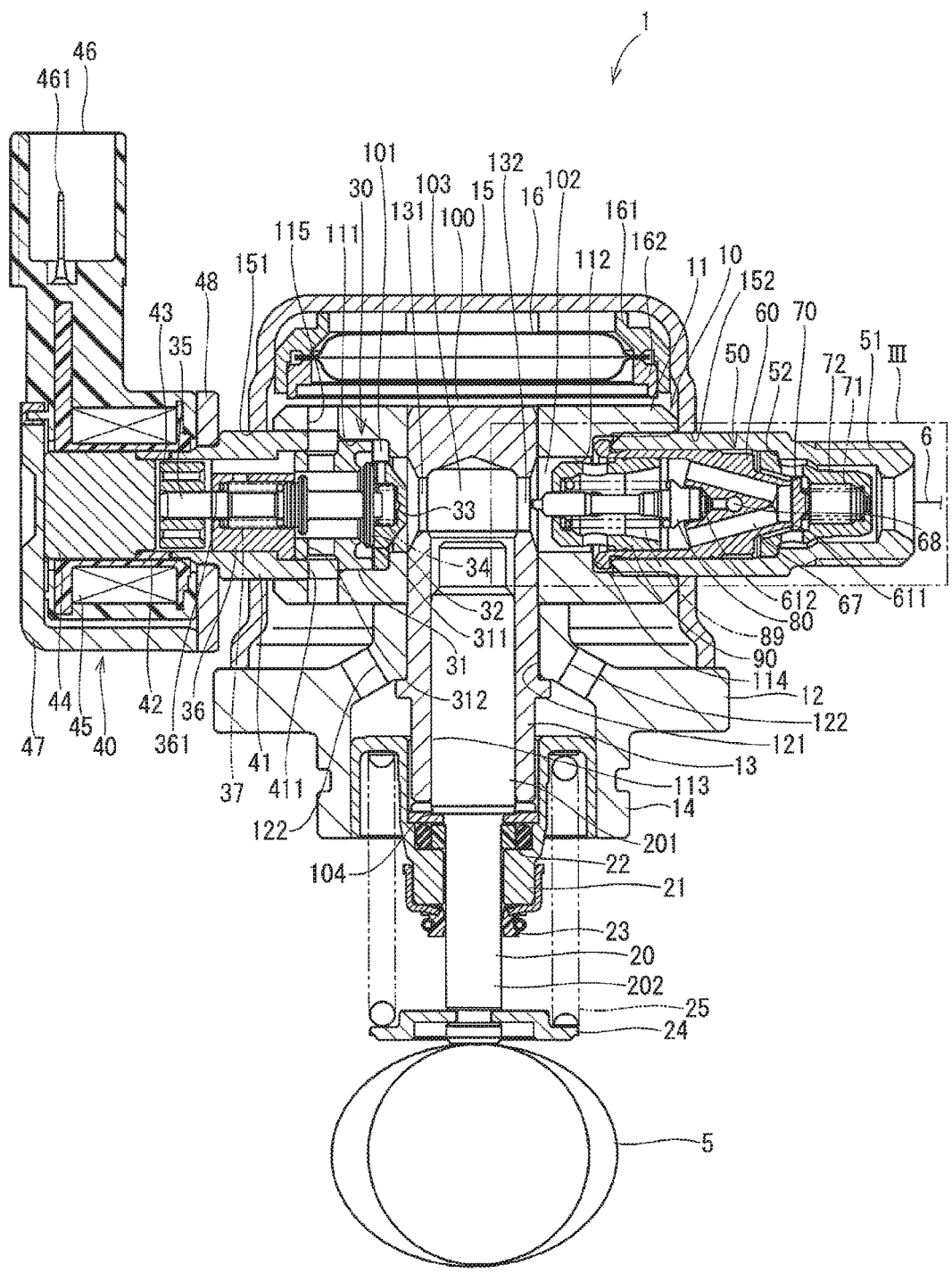
FIG. 2 is a cross-sectional view showing a high-pressure pump according to the first embodiment.

A high-pressure pump according to a first embodiment of the present disclosure is illustrated in FIG. 2.

A high-pressure pump 1 is provided in a vehicle not shown. The high-pressure pump 1 is a pump that supplies a fuel at a high pressure to an engine, for example, as an internal combustion engine. The fuel supplied to the engine by the high-pressure pump 1 is, for example, gasoline. In other words, a fuel supply target of the high-pressure pump 1 is a gasoline engine.

As illustrated in FIG. 1, the fuel stored in the fuel tank 2 is supplied to the high-pressure pump 1 through a pipe 4 by a fuel pump 3. The high-pressure pump 1 pressurizes the fuel supplied from the fuel pump 3 and discharges the pressurized fuel to a fuel rail 7 through a pipe 6. As a result, the fuel in the fuel rail 7 is accumulated and injected and supplied to the engine from fuel injection valves 8 connected to the fuel rail 7. As illustrated in FIG. 2, the high-pressure pump 1 includes a pump body 10, a cover 15, a pulsation damper 16, a plunger 20, an intake valve device 30, an electromagnetic drive portion 40, a discharge valve device 50, and the like. The pump body 10 includes an upper housing 11, a lower housing 12, a cylinder 13, a holder support portion 14, a union 51, and the like.

The upper housing 11 is formed in a substantially rectangular parallelepiped block shape and made of a metal such as stainless steel. The upper housing 11 includes an intake hole portion 111, a discharge hole portion 112, a cylinder hole portion 113, a step portion 114, and the like. The intake hole portion 111 opens at one end of the upper housing 11 in a longitudinal direction and is formed in a substantially cylindrical shape so as to extend in the longitudinal direction. As a result, an intake passage 101 is formed inside the intake hole portion 111. The discharge hole portion 112 opens at the other end of the upper housing 11 in the longitudinal direction and is formed in a substantially cylindrical shape so as to extend in the longitudinal direction. As a result, a discharge passage 102 is provided inside the discharge hole portion 112. In this example, the intake hole portion 111 and the discharge hole portion 112 are coaxially provided.

The cylinder hole portion 113 is formed in a substantially cylindrical shape between the intake hole portion 111 and the discharge hole portion 112 so as to open at both end portions of the upper housing 11 in a lateral direction. In this example, a space inside the cylinder hole portion 113 is connected to the intake passage 101 and the discharge passage 102. The step portion 114 is provided on an inner wall of the upper housing 11 provided with the discharge hole portion 112. An inner diameter of a part of the discharge hole portion 112 extending from the step portion 114 toward the intake hole portion 111 is smaller than an inner diameter of a part of the discharge hole portion 112 extending from the step portion 114 in a direction away from the intake hole portion 111 (refer to FIGS. 2 and 3).

The lower housing 12 is formed in a plate shape and made of a metal such as stainless steel. The lower housing 12 includes a cylinder hole portion 121. The cylinder hole portion 121 is formed in a substantially circular shape so as to penetrate through the lower housing 12 in a plate thickness direction. The lower housing 12 is provided so as to be engaged with the upper housing 11 so that the cylinder hole portion 113 and the cylinder hole portion 121 are coaxially provided. In this example, the upper housing 11 and the lower housing 12 correspond to a "housing" in the claims.

The cylinder 13 is formed in a bottomed cylindrical shape and made of a metal such as stainless steel. The cylinder 13 has an intake hole 131 and a discharge hole 132. The intake hole 131 and the discharge hole 132 are provided in the vicinity of a bottom portion of the cylinder portion of the cylinder 13 so as to face each other. In other words, the intake hole 131 and the discharge hole 132 are formed so as to extend in the radial direction of the cylinder 13 so as to sandwich the axis of the cylinder 13 between the intake hole 131 and the discharge hole 132. The cylinder 13 is inserted through the cylinder hole portion 113 of the upper housing 11 and the cylinder hole portion 121 of the lower housing 12 so that the intake hole 131 is connected to the intake passage 101 and the discharge hole 132 is connected to the discharge passage 102. An outer wall of a bottom end portion of the cylinder 13 is fitted to an inner wall forming the cylinder hole portion 113 of the upper housing 11.

The holder support portion 14 is formed in a substantially cylindrical shape and made of a metal such as stainless steel. One end of the holder support portion 14 is provided to connect to an opposite side of the lower housing 12 from the upper housing 11 so that the holder support portion 14 is coaxial with the cylinder 13. In the present embodiment, the holder support portion 14 is formed integrally with the lower housing 12.

The union 51 is formed in a substantially cylindrical shape and made of a metal such as stainless steel. The union 51 is provided such that one end of the union 51 is inserted into the discharge hole portion 112 of the upper housing 11. In the present embodiment, the union 51 has threads on the outer wall at one end, and the upper housing 11 has screw grooves on the inner wall of the discharge hole portion 112. The union 51 is fixed to the upper housing 11 by being screwed into the discharge hole portion 112. The union 51 forms the discharge passage 102 therein. Further, the union 51 has a step portion 52. The step portion 52 is formed on an inner wall of the union 51. An inner diameter of a part of the union 51 extending from the step portion 52 toward the step portion 114 is larger than an inner diameter of another part of the union 51 extending from the step portion 52 in a direction away from the step portion 114 (refer to FIGS. 2 and 3). The other end of the union 51, that is, an end portion of the union 51 opposite from the upper housing 11 is connected to an end of the pipe 6 opposite from the fuel rail 7.

The cover 15 is formed in a bottomed cylindrical shape, that is, a cup shape, and made of a metal such as stainless steel. The cover 15 accommodates the upper housing 11 therein, and an end portion of the cover 15 on its opening side is connected to an outer edge portion of the lower housing 12. The cover 15 and the lower housing 12 are connected to each other by welding over the entire circumference. As a result, the cover 15 and the lower housing 12 are liquid-tightly kept. A fuel gallery 100 is formed between the inside of the cover 15 and the lower housing 12. The cover 15 is provided with an inlet portion not shown. A pipe 4 connected to the fuel pump 3 is connected to the inlet portion. As a result, the fuel in the fuel tank 2 flows into the inside of the cover 15, that is, into the fuel gallery 100 through the inlet portion.

The cover 15 has a first hole 151 and a second hole 152. The first hole 151 and the second hole 152 are each formed so as to connect the inner wall and the outer wall of the cover 15. The first hole 151 and the second hole 152 are formed at positions corresponding to the intake hole portion 111 and the discharge hole portion 112 of the upper housing 11, respectively. In this example, the union 51 is provided so as to be inserted through the second hole 152 of the cover 15 and the discharge hole portion 112 of the upper housing 11. The outer wall of the union 51 and the second hole 152 of the cover 15 are welded together over the entire circumference. As a result, the union 51 and the cover 15 are liquid-tightly kept.

The pulsation damper 16 is provided between a bottom portion of the cover 15 and the upper housing 11. The pulsation damper 16 is formed, for example, by joining peripheral portions of two diaphragms together, and gas at a predetermined pressure is sealed inside the pulsation damper 16. A locking member 161 is provided in the vicinity of the bottom portion of the cover 15. A damper support portion 162 is provided on a side of the locking member 161 facing the upper housing 11. The damper support portion 162 sandwiches an outer edge portion of the pulsation damper 16 in cooperation with the locking member 161 and is fitted to the locking member 161, to thereby support the pulsation damper 16. The pulsation damper 16 is capable of reducing fuel pressure pulsation with elastic deformation according to a change in the fuel pressure in the fuel gallery 100.

The plunger 20 is formed in a substantially columnar shape and made of a metal such as stainless steel. The plunger 20 includes a large diameter portion 201 and a small diameter portion 202. The small diameter portion 202 has an outer diameter smaller than an outer diameter of the large diameter portion 201. The large diameter portion 201 and the small diameter portion 202 are coaxially integrated together. The plunger 20 is provided such that the large diameter portion 201 is inserted into the inside of the cylinder 13. The outer diameter of the large diameter portion 201 of the plunger 20 is formed to be substantially equal to an inner diameter of the cylinder 13 or slightly smaller than the inner diameter of the cylinder 13. With the above configuration, the plunger 20 is supported such that an outer wall of the large diameter portion 201 slides on an inner wall of the cylinder 13 and is reciprocally movable in the axial direction by the cylinder 13. A pressurizing chamber 103 is provided between inner walls of a cylinder portion and a bottom portion of the cylinder 13 and an outer wall of an end portion of the large diameter portion 201 of the plunger 20. A volume of the pressurizing chamber 103 changes when the plunger 20 reciprocates in the cylinder 13.

In the present embodiment, a seal holder 21 is provided inside the holder support portion 14. The seal holder 21 is formed in a cylindrical shape and made of a metal such as stainless steel. The seal holder 21 is provided so that an outer wall of the seal holder 21 is fitted to an inner wall of the holder support portion 14. The seal holder 21 is provided so as to provide a substantially cylindrical clearance between the inner wall of an end portion of the seal holder 21 opposite to the cylinder 13 and the outer wall of the small diameter portion 202 of the plunger 20. The seal 22 having the annular seal 22 between the inner wall of the seal holder 21 and the outer wall of the small diameter portion 202 of the plunger 20 includes a ring made of Teflon (registered trademark) on a radially inner side and a ring made of rubber on a radially outer side. A thickness of a fuel oil film around the small diameter portion 202 of the plunger 20 is adjusted by the seal 22, and leakage of the fuel to the engine is prevented. An oil seal 23 is provided at an end portion of the seal holder 21 opposite from the cylinder 13. The thickness of the oil film around the small diameter portion 202 of the plunger 20 is adjusted by the oil seal 23, and leakage of oil is prevented.

A variable volume chamber 104 whose volume changes when the plunger 20 reciprocates is provided between a stepped surface between the large diameter portion 201 and the small diameter portion 202 of the plunger 20 and the seal 22. Further, in the present embodiment, the lower housing 12 has a hole portion 122 capable of communicating the fuel gallery 100 with the variable volume chamber 104. As a result, the fuel in the fuel gallery 100 can move back and forth relative to the variable volume chamber 104 through the hole portion 122.

A substantially disc shaped spring seat 24 is provided at an end portion of the small diameter portion 202 of the plunger 20 opposite from the large diameter portion 201. An urging member 25 is provided between the seal holder 21 and the spring seat 24. The urging member 25 is formed of, for example, a coil spring, one end of which is in contact with the spring seat 24 and another end of which is in contact with the seal holder 21. The urging member 25 urges the plunger 20 through the spring seat 24 in a direction away from the pressurizing chamber 103.

The high-pressure pump 1 is disposed in an engine in such a manner that the end portion of the small diameter portion 202 of the plunger 20 opposite from the large diameter portion 201 is in contact with a cam 5 of a camshaft which rotates in conjunction with a drive shaft of the engine (refer to FIG. 1). As a result, when the engine is rotating, the plunger 20 reciprocates in the axial direction with the rotation of the cam 5. At this time, the respective volumes of the pressurizing chamber 103 and the variable volume chamber 104 are periodically changed. The intake valve device 30 is provided in the intake passage 101 of the upper housing 11. The intake valve device 30 includes an intake valve seat portion 31, an intake valve member 32, a stopper 33, an intake valve urging member 34, and the like.

The intake valve seat portion 31 is formed in a cylindrical shape and made of a metal such as stainless steel. The intake valve seat portion 31 is provided so that an outer wall of the intake valve seat portion 31 is fitted to an inner wall of the upper housing 11 forming the intake hole portion 111. The intake valve seat portion 31 has an intake valve seat 311. The intake valve seat 311 has an annular shape and surrounds a hole in the center of a wall surface of the intake valve seat portion 31 facing the pressurizing chamber 103.

The intake valve member 32 is made of a metal such as stainless steel. The intake valve member 32 has, for example, a substantially disc-shaped plate portion. The intake valve member 32 is provided such that a plate portion of the intake valve member 32 can contact the intake valve seat 311 and can reciprocate within the intake passage 101.

The stopper 33 is formed in a bottomed cylindrical shape and made of a metal such as stainless steel. The stopper 33 is provided so that an outer wall of the stopper 33 is fitted to the inner wall of the upper housing 11 forming the intake hole portion 111. The intake valve urging member 34 is provided between the plate portion of the intake valve member 32 and the bottom portion of the stopper 33. The intake valve urging member 34 urges the intake valve member 32 toward the intake valve seat 311.

In the present embodiment, the fuel is capable of flowing through a flow channel provided in an outer edge portion of the stopper 33 between a space between the intake valve seat portion 31 and the stopper 33 and a space between the pressurizing chamber 103 and the stopper 33. In addition, the stopper 33 is, by contacting the intake valve member 32, capable of limiting the movement of the intake valve member 32 toward the pressurizing chamber 103, that is, the movement in a valve opening direction. Further, the stopper 33 has a bottom portion between the intake valve member 32 and the pressurizing chamber 103, thereby being capable of preventing the fuel from the pressurizing chamber 103 from colliding with the intake valve member 32.

The electromagnetic drive portion 40 is provided in the vicinity of the intake valve device 30. The electromagnetic drive portion 40 includes a cylinder member 41, a nonmagnetic member 42, a needle 35, a needle guide portion 36, a needle urging member 37, a movable core 43, a fixed core 44, a coil 45, a connector 46, cover members 47 and 48, and so on.

The cylinder member 41 is formed in a substantially cylindrical shape and made of a magnetic material, for example. The cylinder member 41 is provided so as to be inserted through the first hole 151 of the cover 15 and the intake hole portion 111 of the upper housing 11. An outer wall of one end of the cylinder member 41 is fitted to an inner wall of the intake hole portion 111 of the upper housing 11. In this example, the intake valve seat portion 31 and the stopper 33 are sandwiched between one end of the cylinder member 41 and the inner wall forming the intake hole portion 111 of the upper housing 11. An end portion of the intake valve seat portion 31 opposite from the intake valve seat 311 is located inside one end of the cylinder member 41.

The intake valve seat portion 31 has a hole portion 312 that connects an inner wall and an outer wall of the intake valve seat portion 31. A plurality of the hole portions 312 are provided at regular intervals in a circumferential direction of the intake valve seat portion 31. In the present embodiment, two hole portions 312 are provided. In other words, the two hole portions 312 are provided to face each other across an axis of the intake valve seat portion 31. Further, the cylinder member 41 has a groove portion 411 provided so as to be notched from one end of the cylinder member 41 toward the other end. Two groove portions 411 are provided in total at positions corresponding to the hole portions 312 of the intake valve seat portion 31 one by one. Further, the upper housing 11 has a hole portion 115 that connects an inner wall and an outer wall forming the intake hole portion 111. Two hole portions 115 are provided in total at positions corresponding to the groove portions 411 of the cylinder member 41 one by one. The fuel in the fuel gallery 100 can flow into the inside of the intake valve seat portion 31 through the hole portion 115, the groove portion 411, and the hole portion 312. The fuel that has flowed into the inside of the intake valve seat portion 31 can flow toward the pressurizing chamber 103 through between the intake valve seat 311 and the intake valve member 32 and through the flow channel of the stopper 33.

Further, the outer wall of the cylinder member 41 and the first hole 151 of the cover 15 are welded over an entire circumference. As a result, the cylinder member 41 and the cover 15 are liquid-tightly kept. The nonmagnetic member 42 is formed in a cylindrical shape and made of a nonmagnetic material. The nonmagnetic member 42 is provided on the side of the cylinder member 41 facing away from the upper housing 11 so as to be coaxial with the cylinder member 41. The needle 35 is formed in a rod shape and made of, for example, a metal. The needle 35 is provided so as to reciprocate in the axial direction inside the cylinder member 41. One end of the needle 35 is capable of contacting the intake valve member 32.

The needle guide portion 36 is provided so that an outer wall of the needle guide portion 36 is fitted to an inner wall of the cylinder member 41. The needle guide portion 36 has a guide hole portion 361 in the center. The guide hole portion 361 is formed to connect a wall surface of the needle guide portion 36 facing the pressurizing chamber 103 to a wall surface of the needle guide portion 36 facing away from the pressurizing chamber 103. A needle 35 is inserted through the guide hole portion 361. An inner diameter of the guide hole portion 361 is substantially equal to an outer diameter of the needle 35 or slightly larger than the outer diameter of the needle 35. The inner wall of the guide hole portion 361 and the outer wall of the needle 35 are slidable on each other. As a result, the needle guide portion 36 can guide movement of the needle 35 in the axial direction.

The needle urging member 37 is formed of, for example, a coil spring, and is provided between the pressurizing chamber 103 and the needle guide portion 36. One end of the needle urging member 37 is in contact with a protrusion portion annularly protruding from the needle 35 radially outward, and another end of the needle urging member 37 is provided so as to be in contact with the needle guide portion 36. The needle urging member 37 urges the needle 35 toward the pressurizing chamber 103. Therefore, the needle urging member 37 can urge the intake valve member 32 toward the stopper 33 through the needle 35.

The movable core 43 is formed in a substantially cylindrical shape and made of a magnetic material and press-fitted into the other end of the needle 35. As a result, the movable core 43 can reciprocate in the axial direction together with the needle 35. The fixed core 44 is formed in a solid cylindrical shape and made of a magnetic material and is provided on the side of the movable core 43 opposite from the pressurizing chamber 103. An end portion of the fixed core 44 facing the pressurizing chamber 103 is connected to the nonmagnetic member 42.

The coil 45 is formed in a substantially cylindrical shape and is provided radially outward of the fixed core 44 and the nonmagnetic member 42. The periphery of the coil 45 is molded with a resin material to form the connector 46. The connector 46 is insert-molded with a terminal 461. The terminal 461 and the coil 45 are electrically connected to each other.

The cover members 47 and 48 are made of a magnetic material. The cover member 47 is formed in a bottomed cylindrical shape, and accommodates the fixed core 44 and the coil 45 on an inner side of the cover member 47, and a bottom portion of the cover member 47 contacts the fixed core 44. The cover member 48 is formed in a plate shape and has a hole in the center. The cover member 48 is provided so as to close an opening end of the cover member 47 in a state in which the other end of the cylinder member 41 is inserted through the hole. In this example, the cover member 48 contacts the cover member 47 and the cylinder member 41.

The coil 45 generates a magnetic field by being supplied with electric power from the outside through the terminal 461. When a magnetic field is generated in the coil 45, a magnetic circuit is formed in the fixed core 44, the cover member 47, the cover member 48, the cylinder member 41, and the movable core 43, and the movable core 43 is attracted toward the fixed core 44 together with the needle 35. At this time, the magnetic circuit is formed so as to avoid the nonmagnetic member 42.

When no electric power is supplied to the coil 45, the intake valve member 32 is urged toward the pressurizing chamber 103 by an urging force of the needle urging member 37 through the needle 35, and a surface of the intake valve member 32 facing the stopper 33 is in contact with the stopper 33. At this time, since the intake valve member 32 is separated from the intake valve seat 311, the flow of fuel in the intake passage 101 and the intake hole 131 is permitted. On the other hand, when the movable core 43 and the needle 35 are attracted toward the fixed core 44 by supply of electric power to the coil 45, the intake valve member 32 is urged by the urging force of the intake valve urging member 34 or the like to move away from the pressurizing chamber 103, and thereby contacts the intake valve seat 311. As a result, the fuel flow in the intake passage 101 and the intake hole 131 is blocked. In the manner described above, the intake valve device 30 can allow or interrupt the flow of fuel in the intake passage 101 and the intake hole 131 by the operation of the electromagnetic drive portion 40. In the present embodiment, the intake valve device 30 forms a so-called normally open type valve device together with the electromagnetic drive portion 40.

Figure 3:
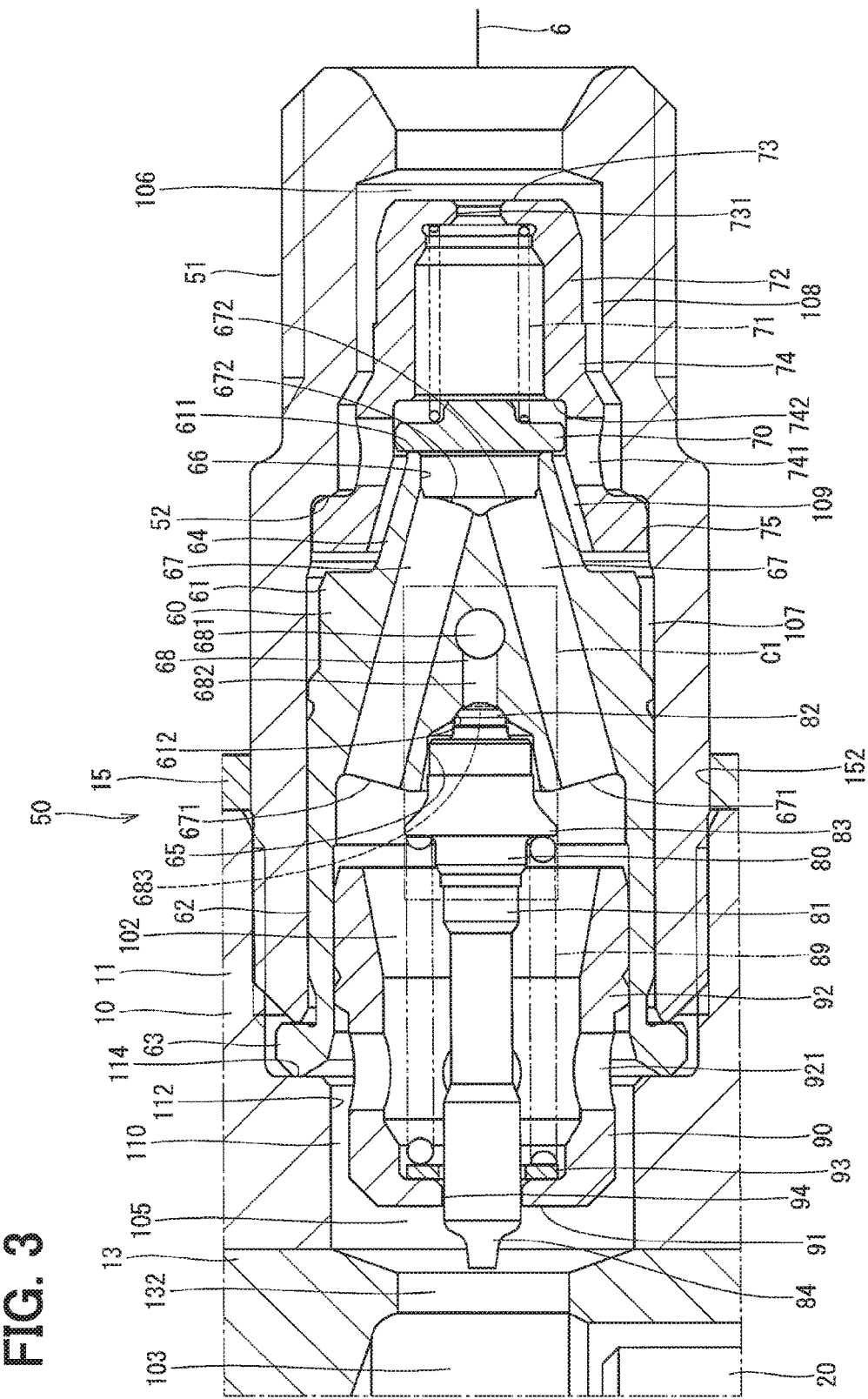
FIG. 3 is a diagram showing a portion III of FIG. 2.

Next, the discharge valve device 50 of the high-pressure pump 1 according to the present embodiment will be described in detail. As illustrated in FIG. 3, the discharge valve device 50 includes a valve seat portion 60, a discharge valve member 70, a discharge valve urging member 71, a relief valve member 80, a relief valve urging member 89, a support portion 90, a fuel guide portion 84, and the like. The valve seat portion 60 is made of a metal such as stainless steel, and is provided inside the union 51. The valve seat portion 60 includes a valve seat main body 61, a discharge valve passage 67, a relief valve passage 68, a discharge valve seat 611, a relief valve seat 612, a valve seat cylinder portion 62, and a valve seat protrusion portion 63.

The valve seat main body 61 is provided in the discharge passage 102 so as to partition the discharge passage 102 into a first space 105 which is a space positioned between the pressurizing chamber 103 and the valve seat main body 61 and a second space 106 which is a space positioned on the opposite side of the valve seat main body 61 from the pressurizing chamber 103. The valve seat main body 61 is provided so that an outer wall of the valve seat main body 61 adjacent to the pressurizing chamber 103 is in contact with the inner wall of the union 51. A cylindrical space 107, which is a substantially cylindrical space, is provided between an outer wall of the valve seat main body 61 opposite from the pressurizing chamber 103 and the inner wall of the union 51.

The valve seat main body 61 has a recess portion 65 provided on the center of an end face of the valve seat main body 61 facing the first space 105 and recessed toward the second space 106. The recess portion 65 has a bottom portion 651, a cylinder portion 652, and a tapered portion 653 (refer to FIG. 4). The bottom portion 651 is tapered so that a distance between an inner wall of the bottom portion 651 and an axis of the valve seat main body 61 decreases in a direction from the first space 105 toward the second space 106. The cylinder portion 652 is formed so as to extend from the outer edge portion of the bottom portion 651 toward the pressurizing chamber 103. The cylinder portion 652 has a substantially cylindrical inner wall. The tapered portion 653 is formed so as to extend toward the pressurizing chamber 103 from an end portion of the cylinder portion 652 which is opposite from the bottom portion 651, and the tapered portion 653 has an opening on an end face of the valve seat main body 61 facing the pressurizing chamber 103. The tapered portion 653 is tapered so that a distance between an inner wall of the tapered portion 653 and an axis of the valve seat main body 61 decreases in a direction from the first space 105 toward the second space 106.

The valve seat main body 61 has a protrusion portion 64 formed so as to protrude toward the second space 106 from the center of the end face of the valve seat main body 61 facing the second space 106. The protrusion portion 64 is tapered so that a distance between an outer wall of the protrusion portion 64 and the axis decreases in a direction from the first space 105 toward the second space 106. The valve seat main body 61 has a recess portion 66 formed on an end face of the protrusion portion 64 facing away from the pressurizing chamber 103 and recessed toward the pressurizing chamber 103.

The discharge valve passage 67 is provided in the valve seat main body 61 so as to connect the first space 105 to the second space 106. An opening 671 of the discharge valve passage 67 in the first space 105 is provided on the radially outward of the recess portion 65. An opening 672 of the discharge valve passage 67 in the second space 106 is provided at the bottom portion of the recess portion 66. In the present embodiment, two discharge valve passages 67 are provided in the valve seat main body 61. Further, the two discharge valve passages 67 are formed such that the axis of the valve seat main body 61 is interposed therebetween, and the discharge valve passages 67 are inclined with respect to the axis.

The relief valve passage 68 is provided in the valve seat main body 61 so as to connect the second space 106 to the first space 105 without communicating with the discharge valve passage 67. In the present embodiment, the relief valve passage 68 has a first passage 681 and a second passage 682. The first passage 681 extends orthogonally to the axis of the valve seat main body 61, and both end portions of the first passage 681 open to an outer wall of the valve seat main body 61. As a result, the first passage 681 communicates with the cylindrical space 107. The second passage 682 extends along the axis of the valve seat main body 61, and one end of the second passage 682 is connected to the center of the first passage 681. In the second passage 682, the opening 683 at the other end is provided in the bottom portion 651 of the recess portion 65 (refer to FIG. 4). The discharge valve seat 611 is annularly formed at the outer edge portion of the recess portion 66. In other words, the discharge valve seat 611 has an annular shape and surrounds the opening 672 of the discharge valve passage 67 of the valve seat main body 61 in the second space 106.

The relief valve seat 612 has an annular shape and surrounds the opening 683 of the relief valve passage 68 of the valve seat main body 61 in the first space 105. In this example, the relief valve seat 612 is tapered so as to decrease in distance from the axis of the relief valve seat 612 in a direction from the first space 105 toward the second space 106 (refer to FIG. 4). The valve seat cylinder portion 62 is formed so as to extend in a cylindrical shape toward the pressurizing chamber 103 from an outer edge portion of an end face of the valve seat main body 61 facing the first space 105. In this example, an outer wall of the valve seat cylinder portion 62 is in contact with an inner wall of the union 51.

The valve seat protrusion portion 63 has an annular shape and protrudes radially outward from an end portion of the valve seat cylinder portion 62 opposite from the valve seat main body 61. In this example, the valve seat protrusion portion 63 is sandwiched between the step portion 114 of the upper housing 11 and the end portion of the union 51 facing the pressurizing chamber 103. As a result, a relative movement of the valve seat portion 60 relative to the upper housing 11 in the axial direction is limited.

The discharge valve member 70 is formed in a substantially disk shape and made of a metal such as stainless steel. The discharge valve member 70 is provided in the second space 106 so as to be capable of contacting the discharge valve seat 611, and separates from the discharge valve seat 611 or contacts the discharge valve seat 611 to open or close the discharge valve passage 67.

In the present embodiment, the discharge valve device 50 further includes a holder 72. The holder 72 is made of a metal such as stainless steel, and is disposed in the second space 106 inside the union 51. The holder 72 includes a holder bottom portion 73, a holder cylinder portion 74, and a holder protrusion portion 75.

The holder bottom portion 73 is formed in a substantially disk shape, and has a hole portion 731 penetrating in a thickness direction in the center of the holder bottom portion 73. The holder cylinder portion 74 is formed so as to extend cylindrically from an outer edge portion of the holder bottom portion 73 toward the pressurizing chamber 103. A cylindrical space 108 which is a substantially cylindrical space is provided between an outer wall of the holder cylinder portion 74 and an inner wall of the union 51. The protrusion portion 64 of the valve seat main body 61 and the discharge valve member 70 are located inside an end portion of the holder cylinder portion 74 opposite from the holder bottom portion 73. An inner wall of an end portion of the holder cylinder portion 74 opposite from the holder bottom portion 73 is tapered so as to correspond to a shape of the outer wall of the protrusion portion 64. A cylindrical space 109, which is a cylindrical space, is provided between the outer wall of the protrusion portion 64 and the inner wall of the holder cylinder portion 74. The cylindrical space 109 and the cylindrical space 107 communicate with each other through a space between the holder 72 and the valve seat main body 61 (refer to FIG. 3).

The holder cylinder portion 74 has multiple hole portions 741 provided so as to connect an inner wall and an outer wall of the holder cylinder portion 74 in the vicinity of the end portion opposite from the holder bottom portion 73. As a result, the hole portion 741 communicates with the cylindrical space 108 and the cylindrical space 109. In the present embodiment, four hole portions 741 are provided at four intervals in the circumferential direction of the holder cylinder portion 74, for example. With the above configuration, the relief valve passage 68 communicates with the cylindrical space 108 through the cylindrical space 107, the cylindrical space 109, and the hole portion 741. The holder cylinder portion 74 has a step portion 742 on an inner wall of the hole portion 741 behind which the holder bottom portion 73 is positioned. The step portion 742 is formed in a substantially annular shape so that the outer edge portion of the discharge valve member 70 can contact the step portion 742.

The holder protrusion portion 75 is annularly formed so as to protrude radially outward from the end portion of the holder cylinder portion 74 opposite from the holder bottom portion 73. The holder 72 is provided so that the holder protrusion portion 75 is fitted to the inner wall of the union 51 and is in contact with the step portion 52 of the union 51.

As a result, relative movement of the holder 72 in the axial direction with respect to the union 51 is restricted.

The discharge valve urging member 71 is, for example, a coil spring, and is provided on a side of the discharge valve member 70 opposite from the valve seat portion 60. The discharge valve urging member 71 is provided inside the holder cylinder portion 74 such that one end of the discharge valve urging member 71 is in contact with the discharge valve member 70 and another end of the discharge valve urging member 71 is in contact with the holder bottom portion 73 of the holder 72. The discharge valve urging member 71 urges the discharge valve member 70 toward the discharge valve seat 611. As a result, the discharge valve member 70 is pressed against the discharge valve seat 611.

The discharge valve member 70 is provided so as to reciprocate inside the holder 72 in the axial direction. The discharge valve member 70 contacts the step portion 742 of the holder 72 to limit the movement toward the holder bottom portion 73. Therefore, the discharge valve member 70 is movable in the axial direction between the discharge valve seat 611 and the step portion 742.

The relief valve member 80 is made of a metal such as stainless steel, for example. In the present embodiment, a hardness of the relief valve member 80 is set to be equal to the hardness of the valve seat portion 60. The relief valve member 80 includes a relief valve main body 81, a relief valve seat portion 82, and a valve member protrusion portion 83.

The relief valve main body 81 is formed in a rod shape, more specifically, a substantially columnar shape. The relief valve member 80 is disposed in the first space 105 so as to be arranged that the end portion 811 which is one end of the relief valve main body 81 is located inside the recess portion 65 of the valve seat main body 61 and the other end of the relief valve main body 81 faces the pressurizing chamber 103 In the first space 105. A large diameter portion 812 is formed on a side of the end portion 811 of the relief valve main body 81 facing the pressurizing chamber 103. The end portion 811 and the large diameter portion 812 are formed in a substantially columnar shape. The large diameter portion 812 has an outer diameter set to be larger than the outer diameter of the end portion 811 (refer to FIG. 4). An outer diameter of the end portion 811 is slightly smaller than an inner diameter of the cylinder portion 652 of the recess portion 65. For that reason, a substantially cylindrical gap is provided between the end portion 811 and the cylinder portion 652.

The relief valve seat portion 82 is integrally formed with the relief valve main body 81 at one axial end (first end) (end portion 811) of the relief valve main body 81 so as to be capable of contacting the relief valve seat 612. More specifically, the relief valve seat portion 82 has a substantially columnar shape and projects from the center of the end portion 811 of the relief valve main body 81 toward the second space 106. A side of the relief valve seat portion 82 facing the second space 106 includes a first tapered surface 821 and a second tapered surface 822. The first tapered surface 821 is tapered so as to decrease in distance from the axis of the relief valve seat portion 82 along a direction from the first space 105 toward the second space 106. The second tapered surface 822 is formed on a side of the first tapered surface 821 facing the second space 106 so as to be connected to the first tapered surface 821. The second tapered surface 822 is tapered so as to decrease in distance from the axis of the relief valve seat portion 82 in the direction from the first space 105 toward the second space 106. In this example, an angle formed by a virtual straight line extending along the first tapered surface 821 and the axis of the relief valve seat portion 82 is smaller than an angle formed by a virtual straight line extending along the second tapered surface 822 and the axis of the relief valve seat portion 82 (refer to FIG. 4). Therefore, an edge is formed between (boundary) the first tapered surface 821 and the second tapered surface 822.

In the present embodiment, the angle formed by the virtual straight line extending along the first tapered surface 821 and the axis of the relief valve seat portion 82 is set to be substantially equal to an angle formed by the virtual straight line extending along the relief valve seat 612 and the axis of the relief valve seat portion 612. For that reason, in the relief valve member 80, the first tapered surface 821 can contact the relief valve seat 612 by surface contact. When the first tapered surface 821 and the relief valve seat 612 come in surface contact with each other, the relief valve seat portion 82 and the relief valve seat 612 are in a coaxial relationship. In this manner, the relief valve member 80 and the relief valve seat 612 are aligned by the first tapered surface 821 and the relief valve seat 612.

Figure 4:
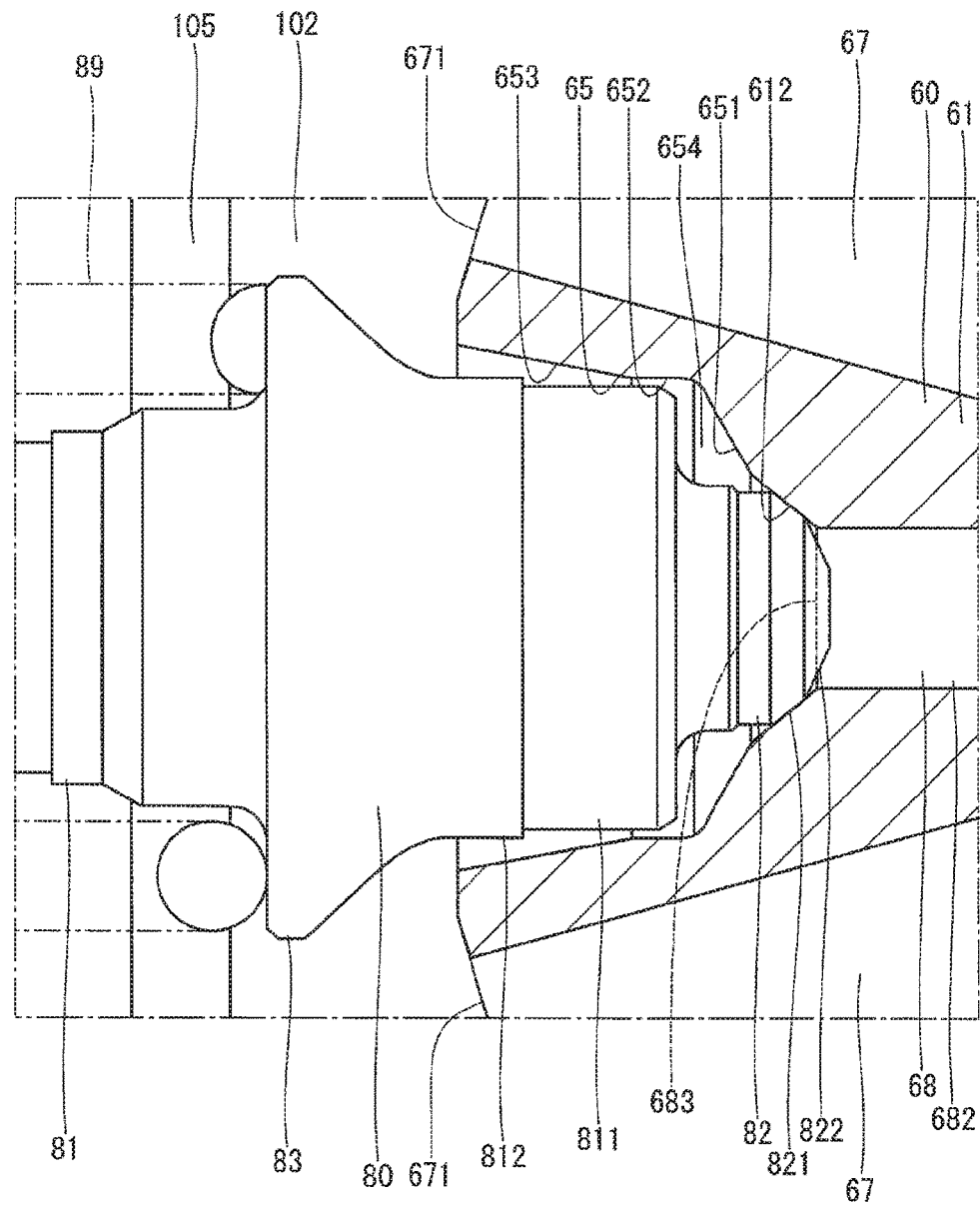
FIG. 4 is a cross-sectional view showing a vicinity of a relief valve seat in the high-pressure pump according to the first embodiment.

As shown in FIG. 4, an intermediate chamber 654 which is an annular space is provided between the relief valve seat portion 82 and the bottom portion 651 and the cylinder portion 652 of the recess portion 65. The valve member protrusion portion 83 has an annular shape and projects radially outward from an end of the large diameter portion 812 of the relief valve main body 81 facing the pressurizing chamber 103. The relief valve member 80 is provided in the first space 105 so as to be reciprocable in an axial direction of the relief valve main body 81.

In the present embodiment, the opening 671 of the discharge valve passage 67 the first space 105 is provided outside of a virtual cylindrical surface C1 that passes through an outermost portion (i.e. outer wall of the valve member protrusion portion 83) of an outer wall of the relief valve member 80 and extends in a cylindrical shape in the axial direction of the relief valve main body 81 (refer to FIG. 3).

The relief valve urging member 89 is formed of, for example, a coil spring, and the relief valve main body 81 is inserted through the inside of the relief valve urging member 89. In other words, the relief valve urging member 89 is provided on a radially outer side of the relief valve main body 81. One end of the relief valve urging member 89 is in contact with a wall surface of the valve member protrusion portion 83 facing the pressurizing chamber 103.

The support portion 90 is formed of a metal such as stainless steel, and is provided in the first space 105. In the present embodiment, a hardness of the support portion 90 is set to be lower than the hardness of the valve seat portion 60 and the relief valve member 80. The support portion 90 includes a support main body 91, a guide hole portion 94, a support cylinder portion 92, and a spring seat member 93.

The support main body 91 is formed in a substantially disc shape and provided in the first space 105. The guide hole portion 94 is formed so as to penetrate through a center of the support main body 91 in a plate thickness direction. In other words, the guide hole portion 94 is formed to connect a surface of the support main body 91 facing the pressurizing chamber 103 and a surface of the support main body 91 facing the valve seat portion 60. The relief valve main body 81 of the relief valve member 80 is inserted through the guide hole portion 94. The guide hole portion 94 has an inner diameter substantially equal to an outer diameter of the other end of the relief valve main body 81, i.e. an outer diameter of an end portion of the relief valve main body 81 facing the pressurizing chamber 103, or somewhat larger than an outer diameter of the end portion of the relief valve main body 81 facing the pressurizing chamber 103. Therefore, the inner wall of the guide hole portion 94 can slide with the outer wall of the other axial end (second end) of the relief valve main body 81.

Figure 5:
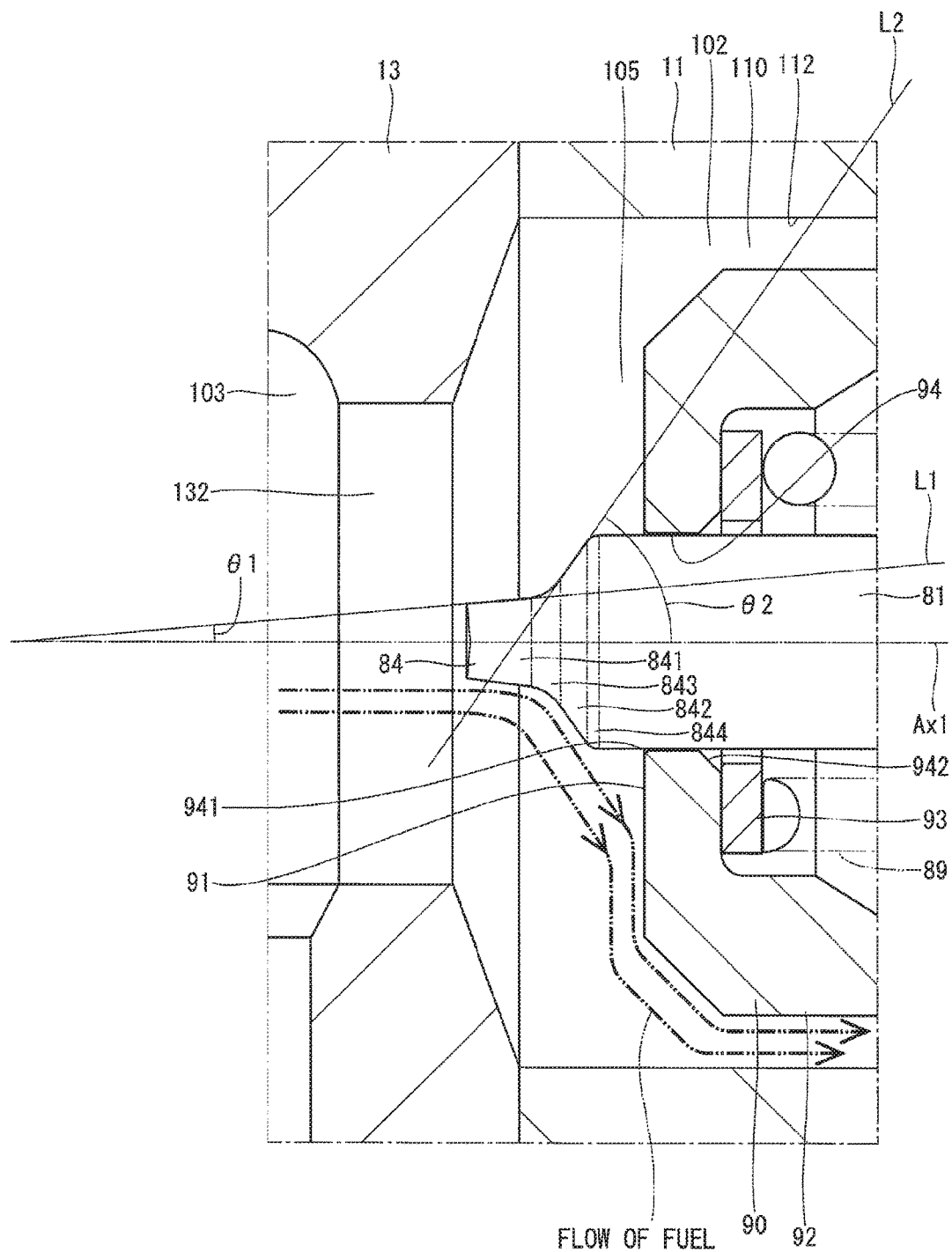
FIG. 5 is a cross-sectional view showing a vicinity of a fuel guide portion of the high-pressure pump according to the first embodiment.

As shown in FIG. 5, the guide hole portion 94 has chamfered portions 941 and 942. The chamfered portion 941 is formed on a side of the guide hole portion 94 facing the pressurizing chamber 103. The chamfered portion 942 is formed between the valve seat portion 60 and the guide hole portion 94. Each of the chamfered portions 941 and 942 has a chamfer angle of 45 degrees. In the present embodiment, a chamfer size of the chamfered portion 941 is set to, for example, C0.1 or less. The size of the chamfered portion 942 is set to be larger than the chamfered portion 941.

The support cylinder portion 92 is formed so as to extend substantially in a cylindrical shape from the outer edge portion of the support main body 91 toward the valve seat portion 60. The support portion 90 is provided such that an outer wall of an end portion of the support cylinder portion 92 opposite from the support main body 91 is fitted to an inner wall of the valve seat cylinder portion 62. As a result, the support portion 90 is provided so as not to be movable relative to the valve seat portion 60, and supports the relief valve member 80 by the support main body 91 so that the relief valve member 80 can reciprocate in the axial direction. In this manner, the support main body 91 of the support portion 90 slidably supports the outer wall of the relief valve main body 81 so as to guide the reciprocating movement of the relief valve member 80 in the axial direction.

In the present embodiment, since the hardness of the support portion 90 is set to be lower than the hardness of the valve seat portion 60, the support cylinder portion 92 can be easily fitted to the inner wall of the valve seat cylinder portion 62. A cylindrical space 110, which is a substantially cylindrical space, is provided between an outer wall of the end portion of the support cylinder portion 92 adjacent to the support main body 91 and the inner wall of the upper housing 11 forming the discharge hole portion 112.

The support cylinder portion 92 has multiple hole portions 921 provided so as to connect the inner wall and the outer wall of the support cylinder portion 92. As a result, the hole portion 921 communicates with the space inside the support cylinder portion 92 and the cylindrical space 110. In the present embodiment, for example, four hole portions 921 are provided at regular intervals in the circumferential direction of the support cylinder portion 92.

The spring seat member 93 is formed in a substantially disk shape separately from the support main body 91 and the support cylinder portion 92. The spring seat member 93 is provided on a side of the support main body 91 facing the valve seat portion 60. The spring seat member 93 has a hole portion penetrating in the plate thickness direction at the center, and an end portion of the relief valve main body 81 facing the pressurizing chamber 103 is inserted into the hole portion.

The other end of the relief valve urging member 89 is in contact with a surface of the spring seat member 93 facing the valve seat portion 60. The relief valve urging member 89 presses the spring seat member 93 against the support main body 91 and urges the relief valve member 80 toward the relief valve seat 612. As a result, the first tapered surface 821 of the relief valve seat portion 82 is pressed against the relief valve seat 612.

As shown in FIG. 5, the fuel guide portion 84 is provided at the other end of the relief valve main body 81, i.e. the end portion facing the pressurizing chamber 103, and is integrated with the relief valve main body 81. The fuel guide portion 84 includes a first specific shape portion 841, a second specific shape portion 842, a third specific shape portion 843, and a fourth specific shape portion 844. The first specific shape portion 841, the third specific shape portion 843, the second specific shape portion 842, and the fourth specific shape portion 844 are integrated together so as to be arranged seamlessly in said order in the direction from the pressurizing chamber 103 toward the valve seat portion 60.

In FIG. 5, in order to avoid complication of the drawing, cross-sectional hatching of the relief valve main body 81 and the fuel guide portion 84 is omitted. Further, a boundary between the first specific shape portion 841 and the third specific shape portion 843, and a boundary between the second specific shape portion 842 and the fourth specific shape portion 844 are indicated by two-dot chain lines.

The first specific shape portion 841 is formed such that the outer wall of the first specific shape portion 841 increases in its distance from the axis Ax1 of the fuel guide portion 84 along the direction from the pressurizing chamber 103 toward the valve seat portion 60. The second specific shape portion 842 is formed between the valve seat portion 60 and the first specific shape portion 841 so that the outer wall of the second specific shape portion 842 increases in its distance from the axis Ax1 along the direction from the pressurizing chamber 103 toward the valve seat portion 60. The first specific shape portion 841 and the second specific shape portion 842 are formed so that a shape of the outer wall of each shape portion is linear in a cross sectional plane which is a virtual plane including the axis Ax1. In other words, the first specific shape portion 841 and the second specific shape portion 842 are tapered so that a diameter reduction ratio, which is a ratio at which the outer diameter decreases according to a positional change in the direction of the axis Ax1, is kept constant.

The fuel guide portion 84 is formed so that a first angle $\theta1$ which is an angle between a first virtual straight line L1 extending along the outer wall of the first specific shape portion 841 and the axis Ax1 is different from a second angle $\theta2$ which is an angle between a second virtual straight line L2 extending along the outer wall of the second specific shape portion 842 and the axis Ax1. In the present embodiment, the first angle $\theta1$ is set to, for example, approximately 5 degrees. The second angle $\theta2$ is set to, for example, approximately 65 degrees.

The third specific shape portion 843 is formed to connect the first specific shape portion 841 to the second specific shape portion 842. In the present embodiment, the third specific shape portion 843 is formed so that a shape of the outer wall in the cross sectional plane which is the virtual plane including the axis Ax1 is curved and recessed toward the axis Ax1. In other words, the third specific shape portion 843 is formed such that the diameter reduction ratio in the direction of the axis Ax1 decreases along the direction from the valve seat portion 60 toward the pressurizing chamber 103.

The fourth specific shape portion 844 is formed to connect the second specific shape portion 842 to an end portion of the relief valve main body 81 facing the pressurizing chamber 103. The fourth specific shape portion 844 is formed so that a shape of the outer wall in the cross sectional plane which is the virtual plane including the axis Ax1 is curved and recessed away from the axis Ax1. In other words, the fourth specific shape portion 844 is formed such that the diameter reduction ratio in the direction of the axis Ax1 increases along the direction from the valve seat portion 60 toward the pressurizing chamber 103.

In the present embodiment, an outer diameter of an end portion of the fourth specific shape portion 844 facing the relief valve main body 81 is set to be equal to the outer diameter of the end portion of the relief valve main body 81 facing the pressurizing chamber 103. Therefore, the outer diameter of the end portion of the fourth specific shape portion 844 facing the relief valve main body 81 is smaller than an inner diameter of the guide hole portion 94. In other words, the fuel guide portion 84 is formed such that a largest outer diameter is smaller than an inner diameter of the guide hole portion 94. With the above configuration, the fuel flowing from the pressurizing chamber 103 to the valve seat portion 60 is guided so as to flow in the direction radially outward of the relief valve main body 81 when flowing along the outer wall of the fuel guide portion 84 (refer to FIG. 5). As described above, the fuel guide portion 84 can guide the fuel so that the fuel flows in the direction radially outward of the relief valve main body 81 on the way from the pressurizing chamber 103 to the valve seat portion 60.

When a pressure of the fuel in the first space 105 is higher than a total of a pressure of the fuel in the second space 106 and an urging force of the discharge valve urging member 71 (the valve opening pressure of the discharge valve member 70), the discharge valve member 70 is separated from the discharge valve seat 611 and opened. At this time, the pressurizing chamber 103 communicates with a space inside the end portion of the union 51 adjacent to the pipe 6 through the discharge hole 132, the cylindrical space 110, the hole portion 921, inner spaces of the support cylinder portion 92 and the valve seat cylinder portion 62, the discharge valve passage 67, the recess portion 66, the hole portion 741, and the cylindrical space 108. As a result, the fuel from the pressurizing chamber 103, that is, the fuel in the first space 105 is discharged toward the pipe 6, i.e. to the second space 106, through the discharge valve seat 611. The valve opening pressure of the discharge valve member 70 can be set by adjusting the urging force of the discharge valve urging member 71.

On the other hand, when a pressure of the fuel in the second space 106 is higher than a total of the pressure of the fuel in the first space 105 and an urging force of the relief valve urging member 89 (the valve opening pressure of the relief valve member 80), the relief valve member 80 is separated from the relief valve seat 612 and opened. At this time, the space inside the end portion of the union 51 adjacent to the pipe 6 communicates with the pressurizing chamber 103 through the cylindrical space 108, the hole portion 741, the cylindrical space 109, the cylindrical space 107, the first passage 681 of the relief valve passage 68, the second passage 682, the recess portion 65, the spaces inside the valve seat cylinder portion 62 and the support cylinder portion 92, the hole portion 921, the cylindrical space 110, and the discharge hole 132. As a result, the fuel on the pipe 6, that is, the fuel in the second space 106 is returned toward the pressurizing chamber 103, i.e. to the first space 105, through the relief valve seat 612. As a result, the pressure of the fuel in the second space 106 can be prevented from increasing abnormally. The valve opening pressure of the relief valve member 80 can be set by adjusting the urging force of the relief valve urging member 89.

Further, in the present embodiment, the urging force of the relief valve urging member 89 is set to be larger than the extent that the end portion 811 of the relief valve member 80 does not come out of the recess portion 65. For that reason, the end portion 811 of the relief valve member 80 is prevented from coming out of the recess portion 65. As described above, the discharge valve device 50 according to the present embodiment is a relief valve integrated discharge valve device having both of a function as the discharge valve and a function as the relief valve.

Next, the operation of the high-pressure pump 1 according to the present embodiment will be described with reference to FIG. 2.

"Intake Process"

When the supply of an electric power to the coil 45 of the electromagnetic drive portion 40 is stopped, the intake valve member 32 is urged toward the pressurizing chamber 103 by the needle urging member 37 and the needle 35. Therefore, the intake valve member 32 is separated from the intake valve seat 311, that is, is opened. In this state, when the plunger 20 moves toward the cam 5, a volume of the pressurizing chamber 103 increases, and the fuel in the intake passage 101 is suctioned into the pressurizing chamber 103.

"Metering Process"

When the plunger 20 moves in a direction away from the cam 5 in a state in which the intake valve member 32 is opened, the volume of the pressurizing chamber 103 decreases, and the fuel in the pressurizing chamber 103 returns to the fuel gallery 100 of the intake passage 101. When the electric power is supplied to the coil 45 during a metering process, the movable core 43 is attracted toward the fixed core 44 together with the needle 35, and the intake valve member 32 contacts and closes the intake valve seat 311. When the plunger 20 moves in the direction away from the cam 5, the intake valve member 32 is closed to block a communication between the pressurizing chamber 103 and the fuel gallery 100 of the intake passage 101, thereby adjusting the amount of fuel returned from the pressurizing chamber 103 toward the fuel gallery 100 of the intake passage 101. As a result, the amount of fuel pressurized in the pressurizing chamber 103 is determined. The intake valve member 32 is closed, to thereby terminate the metering process of returning the fuel from the pressurizing chamber 103 to the fuel gallery 100 of the intake passage 101.

"Pressurizing Process"

When the plunger 20 further moves in the direction away from the cam 5 in a state where the intake valve member 32 is closed, a volume of the pressurizing chamber 103 decreases, and the fuel in the pressurizing chamber 103 is compressed and pressurized. When the pressure of the fuel in the pressurizing chamber 103 becomes equal to or higher than a valve opening pressure of the discharge valve member 70, the discharge valve member 70 opens and the fuel is discharged from the pressurizing chamber 103 toward the pipe 6, i.e. to the second space 106.

When the supply of power to the coil 45 is stopped and the plunger 20 moves toward the cam 5, the intake valve member 32 opens again. As a result, the pressurizing process for pressurizing the fuel is completed, and the intake process of sucking the fuel from the fuel gallery 100 of the intake passage 101 to the pressurizing chamber 103 is restarted.

With the repetition of the "intake process", "metering process" and "pressurizing process" described above, the high-pressure pump 1 pressurizes and discharges the sucked fuel in the fuel tank 2 and supplies the fuel to the fuel rail 7. The supply amount of fuel from the high-pressure pump 1 to the fuel rail 7 is adjusted by controlling a supply timing of the electric power to the coil 45 of the electromagnetic drive portion 40 and the like.

For example, when a state in which the supply of the electric power to the coil 45 is stopped is continued for a predetermined period of time, the intake valve member 32 maintains the valve open state. Therefore, the fuel is not pressurized in the pressurizing chamber 103, and the fuel is not supplied from the high-pressure pump 1 to the fuel rail 7. Even when the intake valve member 32 is maintained in the valve open state due to some cause, such as the fixing of the intake valve member 32, the fuel is not pressurized in the pressurizing chamber 103, and the fuel is not supplied from the high-pressure pump 1 to the fuel rail 7.

On the other hand, for example, when the supply of the electric power to the coil 45 continues for the predetermined period of time, the intake valve member 32 is closed in the pressurizing process. Therefore, the fuel is pressurized in the pressurizing chamber 103, supplied from the high-pressure pump 1 to the rail 7, and the pressure of the fuel in the second space 106, the pipe 6, and the fuel rail 7 increases. Even when the intake valve member 32 is maintained in the valve close state due to some reason such as fixing of the intake valve member 32, the fuel is pressurized in the pressurizing chamber 103 and supplied from the high-pressure pump 1 to the fuel rail 7, and the pressure of the fuel in the second space 106, the pipe 6, and the fuel rail 7 increases.

Figure 6:
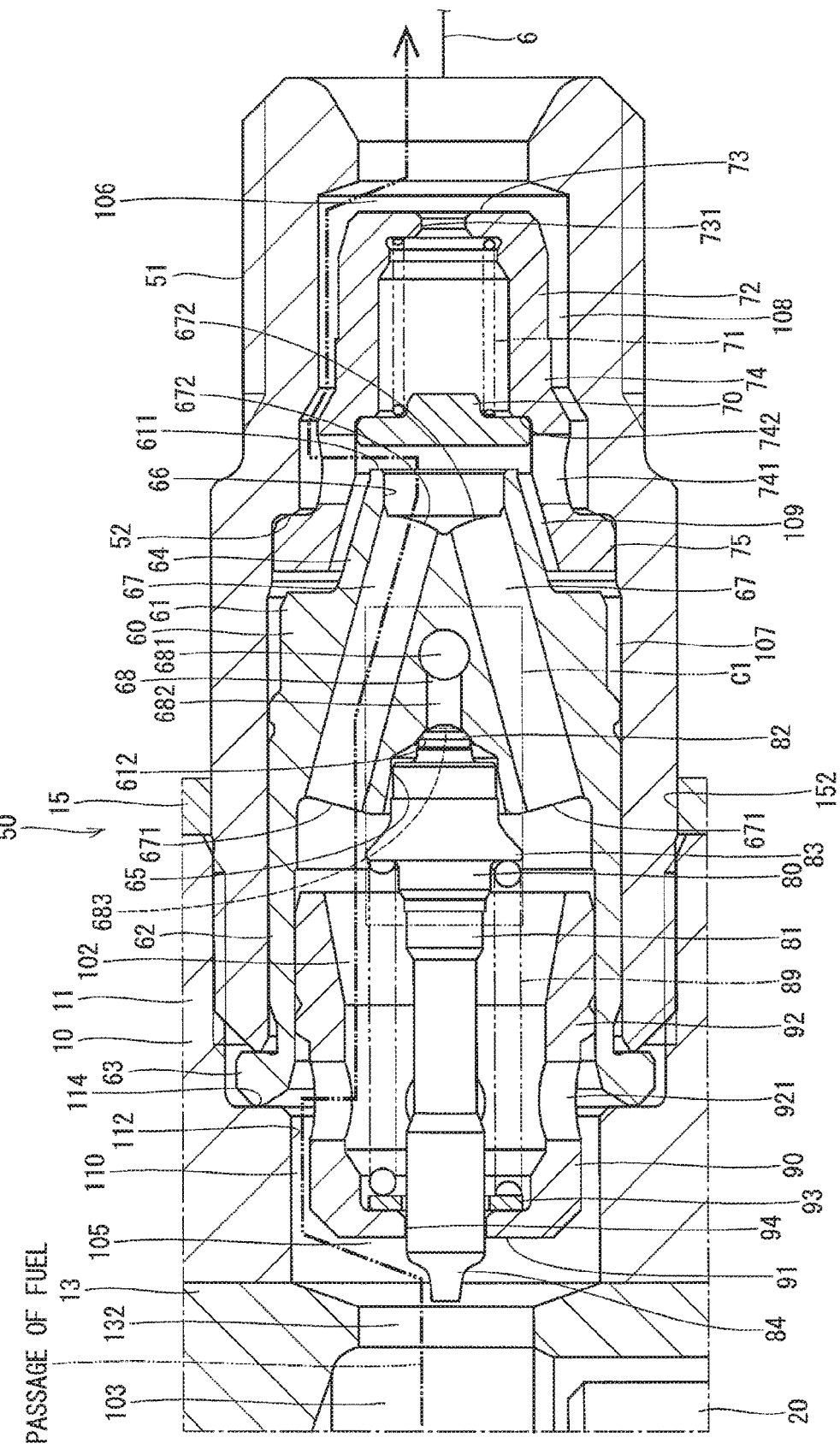
FIG. 6 is a cross-sectional view showing a discharge valve device of the high-pressure pump according to the first embodiment, showing a state in which a fuel flows toward a fuel rail through a discharge valve seat.

Next, the operation of the discharge valve device 50 of the high-pressure pump 1 according to the present embodiment will be described. As shown in FIG. 6, when the pressure of the fuel in the first space 105 becomes larger than the valve opening pressure of the discharge valve member 70, the discharge valve member 70 separates from the discharge valve seat 611 and opens. At this time, the fuel in the pressurizing chamber 103 can flow into the space inside the end portion of the union 51 adjacent to the pipe 6 through the discharge hole 132, the cylindrical space 110, the hole portion 921, the spaces inside the support cylinder portion 92 and the valve seat cylinder portion 62, the discharge valve passage 67, the recess portion 66, the hole portion 741, and the cylindrical space 108.

In the present embodiment, the support main body 91 of the support portion 90 slidably supports the outer wall of the relief valve main body 81 so as to guide the movement of the relief valve member 80 in the axial direction. For that reason, even if the fuel discharged from the pressurizing chamber 103 flows around the relief valve member 80, the relief valve seat portion 82 of the relief valve member 80 is prevented from relatively moving or oscillating in the radial direction with respect to the relief valve seat 612. As a result, wear of the relief valve seat 612 or the relief valve seat portion 82 can be reduced.

In the present embodiment, when the discharge valve member 70 is open, the fuel flowing from the pressurizing chamber 103 to the valve seat portion 60 in the vicinity of the fuel guide portion 84 of the relief valve member 80 is guided to flow in the radially outward direction of the relief valve main body 81 by the fuel guide portion 84 (refer to FIG. 5). As a result, the fuel can be prevented from entering a space between the guide hole portion 94 of the support portion 90 and the relief valve main body 81. For that reason, the cavitation erosion can be prevented from occurring between the guide hole portion 94 and the relief valve main body 81, and erosion of the guide hole portion 94 of the support portion 90 can be reduced.

Further, in the present embodiment, a size of the chamfered portion 941 of the guide hole portion 94 facing the pressurizing chamber 103 is set to be small (C0.1 or less). For that reason, the fuel can be more effectively prevented from entering the space between the guide hole portion 94 of the support portion 90 and the relief valve main body 81.

Further, in the present embodiment, the relief valve seat portion 82 is formed integrally with the relief valve main body 81. For that reason, the relief valve seat portion 82 and the relief valve main body 81 do not move relative to each other. Therefore, the position of the relief valve seat portion 82 is stabilized, for example, as compared with a configuration in which the relief valve main body 81 and the relief valve seat portion 82 are formed separately from each other.

In the present embodiment, the opening 671 of the discharge valve passage 67 in the first space 105 is provided outside of a virtual cylindrical surface C1 that passes through an outermost portion (outer wall of the valve member protrusion portion 83) of an outer wall of the relief valve member 80 and extends in a cylindrical shape in the axial direction of the relief valve main body 81. For that reason, when the fuel is discharged from the pressurizing chamber 103, the fuel around the relief valve main body 81 can smoothly flow into the discharge valve passage 67 without being blocked by the valve member protrusion portion 83 of the relief valve member 80.

Figure 7:
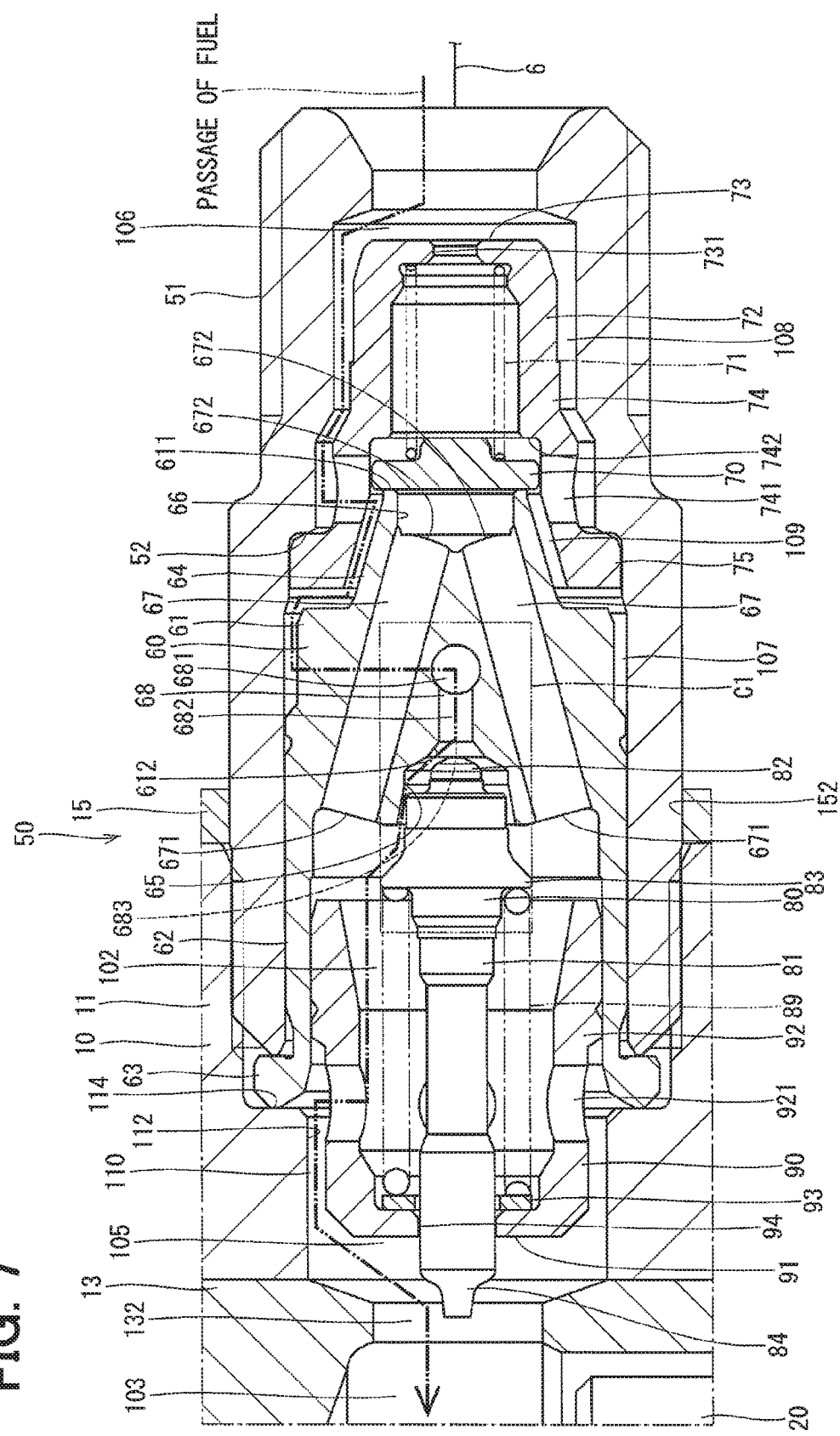
FIG. 7 is a cross-sectional view showing the discharge valve device of the high-pressure pump according to the first embodiment, showing a state in which the fuel flows toward the pressurizing chamber through the relief valve seat.

As shown in FIG. 7, when the pressure of the fuel in the second space 106 becomes larger than the valve opening pressure of the relief valve member 80, the relief valve member 80 separates from the relief valve seat 612 and opens. At this time, the fuel in the space inside the end portion of the union 51 adjacent to the pipe 6 can flow toward the pressurizing chamber 103 through the cylindrical space 108, the hole portion 741, the cylindrical space 109, the cylindrical space 107, the first passage 681 of the relief valve passage 68, the second passage 682, the recess portion 65, the spaces inside the valve seat cylinder portion 62 and the support cylinder portion 92, the hole portion 921, the cylindrical space 110, and the discharge hole 132.

In the present embodiment, the support main body 91 of the support portion 90 slidably supports the outer wall of the relief valve main body 81 so as to guide the reciprocating movement of the relief valve member 80 in the axial direction. As a result, when the relief valve member 80 opens, the movement of the relief valve member 80 toward the pressurizing chamber 103 is stabilized.

Further, in the present embodiment, when the relief valve seat portion 82 is separated from the relief valve seat 612, the fuel in the relief valve passage 68 flows into the intermediate chamber 654 (refer to FIG. 4). As a result, the pressure in the intermediate chamber 654 quickly rises, and the relief valve member 80 can be promptly moved toward the pressurizing chamber 103. The fuel in the intermediate chamber 654 flows between the cylinder portion 652 and the tapered portion 653 of the recess portion 65 and the end portion 811 and the large diameter portion 812 of the relief valve main body 81 toward the pressurizing chamber 103.

As described above, (1) in the present embodiment, the pump body 10 includes the pressurizing chamber 103 for pressurizing the fuel and the discharge passage 102 through which the fuel pressurized by and discharged from the pressurizing chamber 103 flows. The valve seat portion 60 includes the valve seat main body 61, a discharge valve passage 67, the relief valve passage 68, the discharge valve seat 611, and the relief valve seat 612.

The valve seat main body 61 is provided in the discharge passage 102 so as to partition the discharge passage 102 into a first space 105 which is a space positioned between the valve seat main body 61 and the pressurizing chamber 103 and a second space 106 which is a space positioned on the opposite side of the valve seat main body 61 from the pressurizing chamber 103. The discharge valve passage 67 is provided in the valve seat main body 61 so as to connect the first space 105 to the second space 106. The relief valve passage 68 is provided in the valve seat main body 61 so as to connect the second space 106 to the first space 105 and not to communicate with the discharge valve passage 67. The discharge valve seat 611 has an annular shape and surrounds the opening 672 of the discharge valve passage 67 of the valve seat main body 61 in the second space 106. The relief valve seat 612 has an annular shape and surrounds the opening 683 of the relief valve passage 68 of the valve seat main body 61 in the first space 105.

The discharge valve member 70 is provided in the second space 106 so as to be capable of contacting the discharge valve seat 611, and separates from the discharge valve seat 611 or contacts the discharge valve seat 611 to open or close the discharge valve passage 67. The discharge valve urging member 71 urges the discharge valve member 70 toward the discharge valve seat 611. The relief valve member 80 includes a relief valve main body 81 and a relief valve seat portion 82.

The relief valve main body 81 is formed in a rod shape. The relief valve seat portion 82 is formed integrally with the relief valve main body 81 at one end of the relief valve main body 81 so as to be capable of contacting the relief valve seat 612. The relief valve member 80 is provided in the first space 105 so as to reciprocate in the axial direction. The relief valve urging member 89 urges the relief valve member 80 toward the relief valve seat 612. The support portion 90 includes the support main body 91 and the guide hole portion 94.

The support main body 91 is disposed in the first space 105. The guide hole portion 94 connects a surface of the support main body 91 facing the pressurizing chamber 103 and a surface of the support main body 91 facing the valve seat portion 60, and the relief valve main body 81 is inserted into the guide hole portion 94. The guide hole portion 94 of the support portion 90 slidably supports the outer wall of the relief valve main body 81 so as to guide the reciprocating movement of the relief valve member 80 in the axial direction. The fuel guide portion 84 is provided at an end portion of the relief valve main body 81 facing the pressurizing chamber 103 and can guide the fuel so that the fuel flows in the direction radially outward of the relief valve main body 81 on the way from the pressurizing chamber 103 to the valve seat portion 60.

In the present embodiment, the guide hole portion 94 of the support portion 90 slidably supports the outer wall of the relief valve main body 81 so as to guide the reciprocating movement of the relief valve member 80 in the axial direction. For that reason, even if the fuel discharged from the pressurizing chamber 103 in the high-pressure pump 1 flows around the relief valve member 80, the relief valve seat portion 85 of the relief valve member 80 is prevented from relatively moving or oscillating in the radial direction with respect to the relief valve seat 612. As a result, wear of the relief valve seat 612 or the relief valve seat portion 85 can be reduced. Therefore, a change over time in the valve opening pressure of the relief valve member 80 can be reduced.

In the present embodiment, for example, when the fuel is discharged from the pressurizing chamber 103, the fuel passing by the fuel guide portion 84 from the pressurizing chamber 103 toward the valve seat portion 60 flows in the direction radially outward of the relief valve main body 81. For that reason, the fuel can be prevented from entering a space between the inner wall of the guide hole portion 94 and the outer wall of the relief valve main body 81. As a result, cavitation erosion occurs between the guide hole portion 94 and the relief valve main body 81, and the guide hole portion 94 or the relief valve main body 81 can be prevented from being eroded. As a result, the backlash between the guide hole portion 94 and the relief valve main body 81 can be prevented from increasing even after a long period of time, and the relief valve seat 612 or the relief valve seat portion 85 can be prevented from being worn. As a result, according to the present embodiment, a change over time in the valve opening pressure of the relief valve member 80 can be reduced for a long period of time.

(2) In the present embodiment, the support portion 90 slidably supports the outer wall of the other end side of the relief valve main body 81, that is, the end portion facing the pressurizing chamber 103 by the guide hole portion 94. In other words, the fuel guide portion 84 and the guide hole portion 94 are disposed at relatively close positions. In the present embodiment, the fuel flowing from the pressurizing chamber 103 toward the valve seat portion 60 is guided by the fuel guide portion 84 to flow in the direction radially outward of the relief valve main body 81. Therefore, even if the fuel guide portion 84 and the guide hole portion 94 are disposed close to each other, the fuel can be effectively prevented from entering a space between the guide hole portion 94 and the relief valve main body 81.

Further, with the configuration in which the guide hole portion 94 supports the outer wall of the relief valve main body 81 on the other end, the axis of the relief valve member 80 can be effectively prevented from being inclined during the reciprocating movement of the relief valve member 80. Since a sliding portion between the inner wall of the support portion 90 and the outer wall of the relief valve main body 81 is located at a position far from the relief valve seat 612, the inner wall of the support portion 90 and the outer wall of the relief valve main body 81 are abraded by sliding. Even if abrasion powder is generated, the abrasion powder can be prevented from being caught between the relief valve seat 612 and the relief valve seat portion 82.

(3) In the present embodiment, the fuel guide portion 84 includes the first specific shape portion 841 whose outer wall increases in its distance from the axis Ax1 of the fuel guide portion 84 in the direction from the pressurizing chamber 103 toward the valve seat portion 60, and the second specific shape portion 842 which is formed between the valve seat portion 60 and the first specific shape portion 841 so that an outer wall of the second specific shape portion 842 increases in its distance from the axis Ax1 in the direction from the pressurizing chamber 103 toward the valve seat portion 60. This exemplifies a specific configuration of the fuel guide portion 84 according to the present embodiment. With the above configuration, the fuel flowing from the pressurizing chamber 103 toward the valve seat portion 60 can be effectively guided so as to flow in the direction radially outward of the relief valve main body 81 by the fuel guide portion 84.

Also, (4) in the present embodiment, the fuel guide portion 84 is formed so that a first angle $\theta 1$ which is an angle between a first virtual straight line L1 extending along the outer wall of the first specific shape portion 841 and the axis Ax1 is different from a second angle $\theta 2$ which is an angle between a second virtual straight line L2 extending along the outer wall of the second specific shape portion 842 and the axis Ax1. In the present embodiment, the second angle $\theta 2$ is set to be larger than the first angle $\theta 1$. With the above configuration, the fuel flowing from the pressurizing chamber 103 toward the valve seat portion 60 can be more effectively guided so as to flow in the direction radially outward of the relief valve main body 81 by the fuel guide portion 84.

(5) In the present embodiment, the fuel guide portion 84 includes the third specific shape portion 843 that connects the first specific shape portion 841 to the second specific shape portion 842.

(6) In the present embodiment, the third specific shape portion 843 is formed so that a shape of the outer wall in the cross sectional plane which is the virtual plane including the axis Ax1 of the fuel guide portion 84 is curved.

With the above configuration, the fuel flowing from the pressurizing chamber 103 toward the valve seat portion 60 can be more effectively guided so as to flow in the direction radially outward of the relief valve main body 81 by the fuel guide portion 84.

(8) In the present embodiment, the fuel guide portion 84 is formed integrally with the relief valve main body 81. For that reason, the number of members 55 can be reduced.

(10) In the present embodiment, the fuel guide portion 84 is formed such that a largest outer diameter is smaller than an inner diameter of the guide hole portion 94. Therefore, the relief valve main body 81 can be inserted into the guide hole portion 94 from the valve seat portion 60 of the support portion 90 together with the fuel guide portion 84. Since the relatively large chamfered portion 942 is formed on the side of the guide hole portion 94 facing the valve seat portion 60, the relief valve main body 81 can be easily inserted into the guide hole portion 94 from the valve seat portion 60 of the support portion 90 together with the fuel guide portion 84.

(12) In the present embodiment, the valve seat portion 60 has the valve seat cylinder portion 62 that extends in the cylindrical shape from the valve seat main body 61 toward the first space 105. The support portion 90 has the support cylinder portion 92 that extends in the cylindrical shape from the support main body 91 toward the second space 106 and is fitted to the inner wall of the valve seat cylinder portion 62.

As described above, in the present embodiment, since the support portion 90 is fitted to the inner wall of the valve seat portion 60, the hardness of the support portion 90 is set to be lower than the hardness of the valve seat portion 60. For that reason, in the present embodiment, the guide hole portion 94 (support portion 90) is easily eroded by the cavitation erosion between the guide hole portion 94 and the relief valve main body 81. However, in the present embodiment, as described above, since the fuel can be prevented from entering the space between the guide hole portion 94 and the relief valve main body 81 by the fuel guide portion 84, erosion of the guide hole portion 94 (support portion 90) can be reduced effectively.

Second Embodiment

Figure 8:
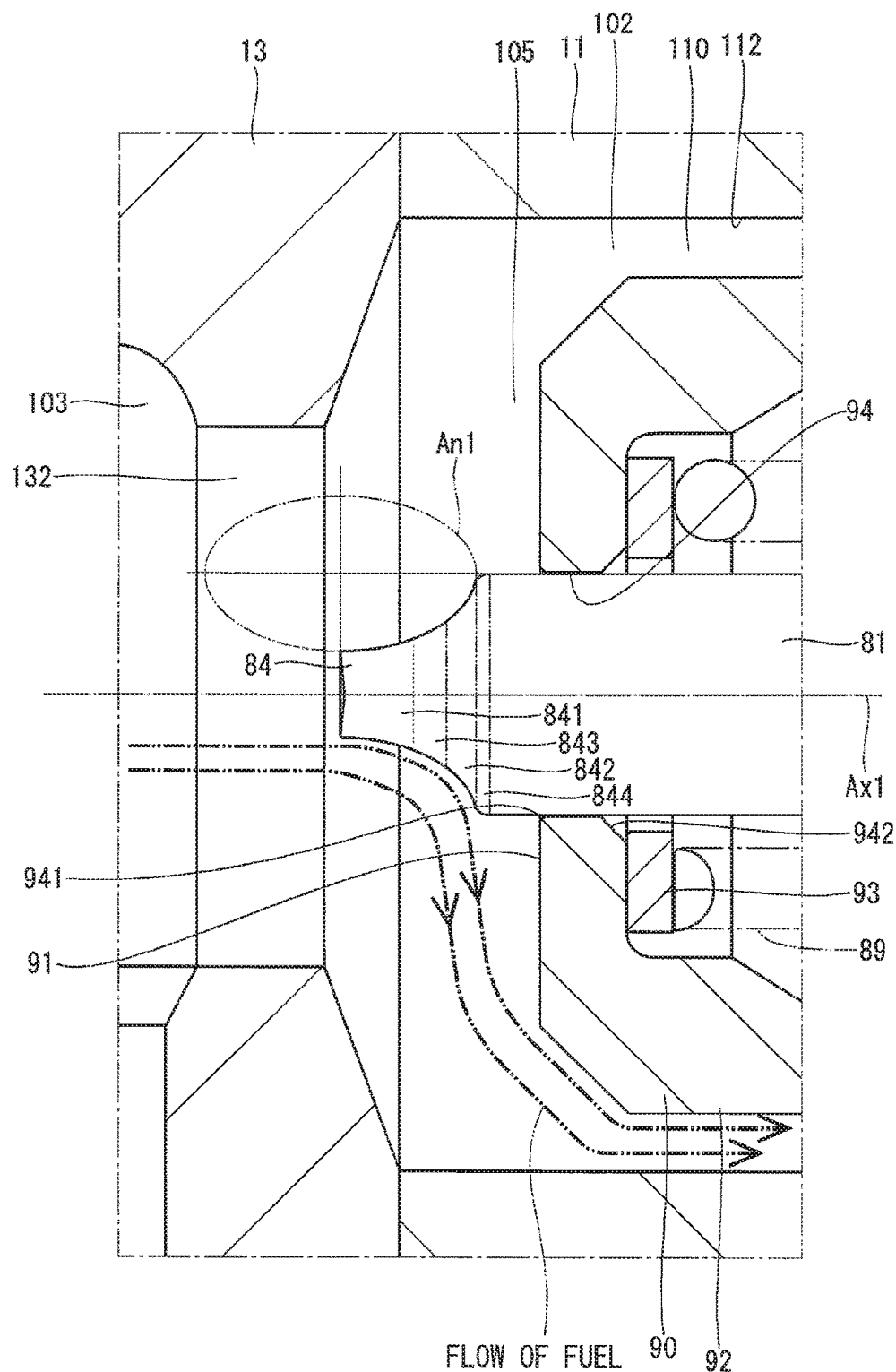
FIG. 8 is a cross-sectional view showing a vicinity of a fuel guide portion in a high-pressure pump according to a second embodiment of the present disclosure.

A part of a high-pressure pump according to a second embodiment of the present disclosure is illustrated in FIG. 8. The second embodiment is different in the shape of a fuel guide portion from the first embodiment.

In the second embodiment, a fuel guide portion 84 is formed so that outer walls of a first specific shape portion 841, a third specific shape portion 843, and a second specific shape portion 842 in a cross section with a virtual plane including an axis Ax1 are shaped along a part of an ellipse An1. The shape of the fourth specific shape portion 844 is the same as that of the first embodiment.

In the present embodiment, the ellipse An1 is shaped such that a straight line extending a long axis extends along the outer wall of the relief valve main body 81. The ellipse An1 is shaped such that a straight line extending a short axis extends along the end face of the first specific shape portion 841 of the fuel guide portion 84 facing the pressurizing chamber 103.

As described above, (7) in the present embodiment, the fuel guide portion 84 is formed so that the outer walls of the first specific shape portion 841 and the second specific shape portion 842 in the cross section with the virtual plane including an axis Ax1 are shaped along a part of the ellipse An1. For that reason, the fuel guide portion 84 can smoothly guide the fuel in the radially outward direction of the relief valve main body 81 when the fuel passes through the fuel guide portion 84 from the pressurizing chamber 103 toward the valve seat portion 60. Therefore, the fluid resistance against the relief valve seat 612 in the direction of the axis Ax1 acting on the relief valve member 80 can be reduced.

Third Embodiment

Figure 9:
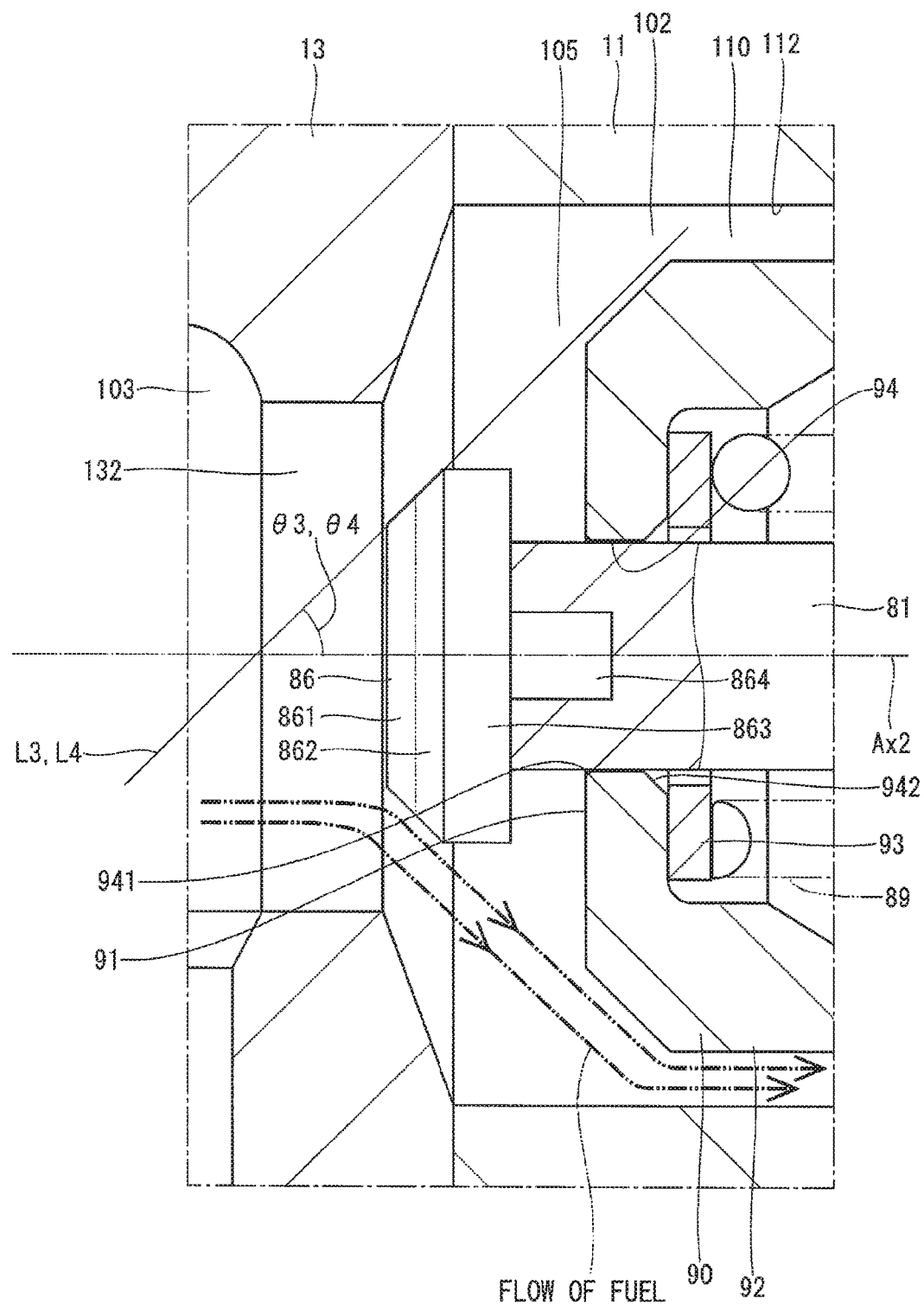
FIG. 9 is a cross-sectional view showing a vicinity of a fuel guide portion in a high-pressure pump according to a third embodiment of the present disclosure.

A part of a high-pressure pump according to a third embodiment of the present disclosure is illustrated in FIG. 9. The second embodiment is different in the shape of a fuel guide portion and so on from the first embodiment.

In the third embodiment, a fuel guide portion 86 is formed separately with a relief valve main body 81.

The fuel guide portion 86 is made of a metal such as stainless steel. The fuel guide portion 86 includes a first specific shape portion 861, a second specific shape portion 862, a base portion 863, and a protrusion portion 864. The first specific shape portion 861, the second specific shape portion 862, the base portion 863, and the protrusion portion 864 are integrated together so as to be aligned consecutively in said order from the pressurizing chamber 103 toward the valve seat portion 60. In FIG. 9, a boundary between the first specific shape portion 861 and the second specific shape portion 862 is indicated by a two-dot chain line.

The first specific shape portion 861 is formed such that the outer wall of the first specific shape portion 861 increases in its distance from the axis Ax2 of the fuel guide portion 86 along a direction from the pressurizing chamber 103 toward the valve seat portion 60. The second specific shape portion 862 is formed between the valve seat portion 60 and the first specific shape portion 861 so that the outer wall of the second specific shape portion 862 increases in its distance from the axis Ax2 along the direction from the pressurizing chamber 103 toward the valve seat portion 60. The first specific shape portion 861 and the second specific shape portion 862 are formed so that a shape of the outer wall of each shape portion is linear in a cross sectional plane which is the virtual plane including the axis Ax2. In other words, the first specific shape portion 861 and the second specific shape portion 862 are tapered so that a diameter reduction ratio, which is a ratio at which the outer diameter decreases according to a positional change in the direction of the axis Ax2, is kept constant.

The fuel guide portion 86 is formed so that a first angle θ3 which is an angle between a first virtual straight line L3 extending along the outer wall of the first specific shape portion 861 and the axis Ax2 is the same as a second angle θ4 which is an angle between a second virtual straight line L4 extending along the outer wall of the second specific shape portion 862 and the axis Ax2. In the present embodiment, the first angle θ3 and the second angle θ4 are set to, for example, approximately 45 degrees.

The base portion 863 is formed on a side of the second specific shape portion 862 facing the valve seat portion 60.

The base portion 863 is formed in a substantially columnar shape. An outer diameter of the base portion 863 is the same as the outer diameter of the end portion of the second specific shape portion 862 facing the valve seat portion 60 and is kept constant in the direction of the axis Ax2.

The protrusion portion 864 is formed so as to project in a substantially columnar shape from a center of the base portion 863 toward the valve seat portion 60. The outer diameter of the protrusion portion 864 is smaller than the outer diameter of the base portion 863. Therefore, a largest outer diameter of the fuel guide portion 86 is the outer diameter of the base portion 863. The relief valve main body 81 has a recess portion 813 that is recessed toward the valve seat portion 60 from the end face facing the pressurizing chamber 103.

The fuel guide portion 86 is provided at the end portion of the relief valve main body 81 facing the pressurizing chamber 103 by fitting the protrusion portion 864 into the recess portion 813. In this example, the outer diameter of the base portion 863 of the fuel guide portion 86, that is, the largest outer diameter of the fuel guide portion 86 is formed to be larger than the outer diameter of the end portion of the relief valve main body 81 facing the pressurizing chamber 103 and the inner diameter of the guide hole portion 94.

As described above, (3) in the present embodiment, the fuel guide portion 86 includes the first specific shape portion 861 in which the outer wall increases in its distance from the axis Ax2 of the fuel guide portion 86 along the direction toward the valve seat portion 60 from the pressurizing chamber 103, and the second specific shape portion 862 which is formed between the valve seat portion 60 and the first specific shape portion 861 so that the outer wall of the second specific shape portion 862 increases in its distance from the axis Ax2 in the direction toward the valve seat portion 60 from the pressurizing chamber 103. With the above configuration, the fuel flowing from the pressurizing chamber 103 toward the valve seat portion 60 can be effectively guided so as to flow in the direction radially outward of the relief valve main body 81 by the fuel guide portion 86.

In the present embodiment, the fuel guide portion 86 is formed so that a first angle θ3 which is an angle between a first virtual straight line L3 extending along the outer wall of the first specific shape portion 861 and the axis Ax2 is the same as a second angle θ4 which is an angle between a second virtual straight line L4 extending along the outer wall of the second specific shape portion 862 and the axis Ax2.

(9) In the present embodiment, the fuel guide portion 86 is formed separately from the relief valve main body 81. For that reason, the fuel guide portion 86 can be machined separately from the relief valve main body 81. Therefore, the influence of the processing of the fuel guide portion 86 on the relief valve main body 81 can be reduced.

(11) In the present embodiment, the fuel guide portion 86 is formed such that a largest outer diameter of the fuel guide portion 86 is larger than an inner diameter of the guide hole portion 94. For that reason, the fuel guide portion 86 blocks the fuel flowing from the pressurizing chamber 103 to the valve seat portion 60, thereby being capable of more effectively preventing the fuel from entering a space between the guide hole portion 94 and the relief valve main body 81. As a result, the relief valve seat 612 or the relief valve seat portion 85 can be effectively prevented from being worn, and a change over time in the valve opening pressure of the relief valve member 80 can be more effectively reduced.

Other Embodiments

In the embodiments described above, the support main body 91 of the support portion 90 slidably supports the outer wall of the other end side of the relief valve main body 81, that is, the end portion facing the pressurizing chamber 103. In contrast, in another embodiment of the present disclosure, the support main body 91 of the support portion 90 may slidably support any position of the relief valve main body 81 in the axial direction. In other words, a distance between the fuel guide portion and the guide hole portion 94 may be set arbitrarily.

Further, in the first embodiment, the fuel guide portion 84 includes the first specific shape portion 841, the second specific shape portion 842, the third specific shape portion 843, and the fourth specific shape portion 844, and the third specific shape portion 843 is formed so that the shape of the outer wall is curved in the cross sectional plane which is the virtual plane including the axis Ax1 of the fuel guide portion 86. In contrast, according to another embodiment of the present disclosure, the third specific shape portion 843 may be formed such that the shape of the outer wall is linear in the cross sectional plane which is the virtual plane including the axis Ax1.

Further, the fuel guide portion 84 may not have the third specific shape portion 843, and the first specific shape portion 841 and the second specific shape portion 862 may be connected to each other. In addition, the first angle θ1 and the second angle θ2 may be set to any size as long as those angles are larger than 0 degrees and smaller than 90 degrees. In addition, the first angle θ1 and the second angle θ2 may be the same in degree. Even if the first angle θ1 and the second angle θ2 are the same in degree as each other, the fuel guide portion 84 can obtain the effect of guiding the fuel so that the fuel passing through the fuel guide portion 84 from the pressurizing chamber 103 toward the valve seat portion 60 flows in the radially outward direction of the relief valve main body 81.

The outer diameter of the end portion of the fourth specific shape portion 844 facing the relief valve main body 81, that is, the largest outer diameter of the fuel guide portion 84 may be formed to be equal to or larger than the inner diameter of the guide hole portion 94. Further, the fuel guide portion 84 may be configured not to have the fourth specific shape portion 844. The fuel guide portion 84 may be formed separately from the relief valve main body 81.

In the second embodiment, the fuel guide portion 84 is formed so that the outer walls of the first specific shape portion 841 and the second specific shape portion 842 in the cross sectional plane which is the virtual plane including the axis Ax1 are shaped along a part of the ellipse An1. In contrast, in another embodiment of the present disclosure, the fuel guide portion 84 may be formed so that the outer walls of the first specific shape portion 841 and the second specific shape portion 842 in the cross sectional plane which is the virtual plane including an axis Ax1 are shaped along a part of a circle.

In the third embodiment, the fuel guide portion 86 is formed such that the first angle θ3 and the second angle θ4 are formed to be the same as each other. In contrast, in another embodiment of the present disclosure, the fuel guide portion 86 may be formed so that the first angle θ3 and the second angle θ4 are different from each other. As in the first embodiment, a third specific shape portion may be provided between the first specific shape portion 861 and the second specific shape portion 862. The outer diameter of the base portion 863, that is, the maximum outer diameter of the fuel guide portion 86 may be equal to or smaller than the inner diameter of the guide hole portion 94, for example, the same as the outer diameter of the end portion of the relief valve main body 81 facing the pressurizing chamber 103. The fuel guide portion 86 may be formed integrally with the relief valve main body 81.

Further, in the embodiments described above, the example in which the support cylinder portion 92 of the support portion 90 is fitted to the inner wall of the valve seat cylinder portion 62 of the valve seat portion 60 is shown. On the contrary, in another embodiment of the present disclosure, the support cylinder portion 92 may be fitted to the outer wall of the valve seat cylinder portion 62.

Further, in another embodiment of the present disclosure, the valve seat portion 60 may not have the valve seat cylinder portion 62. Further, the support portion 90 may not have the support cylinder portion 92. In other words, the valve seat portion 60 and the support portion 90 may not be fitted to each other. In this case, it is conceivable to provide the support portion 90 (the support main body 91) by being fitted to the inner wall of the upper housing 11 forming the discharge hole portion 112. In addition, the hardness of the support portion 90 may be set to be equal to or higher than the hardness of the valve seat portion 60 and the relief valve member 80.

Further, in the embodiments described above, the side of the guide hole portion 94 facing the pressurizing chamber 103 has the chamfered portion 941 having the size C0.1 or less. From the viewpoint of reducing the entry of the fuel between the guide hole portion 94 and the relief valve main body 81, it is preferable that the size of the chamfered portion 941 is as small as possible, but in another embodiment of the present disclosure, the chamfered portion 941 may be set to be larger than C0.1. Further, the guide hole portion 94 may have a configuration without the chamfered portion 941 (i.e. C0). Further, in another embodiment of the present disclosure, at least two of the cylinder, the upper housing, and the lower housing may be integrated together.

Further, in another embodiment of the present disclosure, the intake valve device may configure a normally closed type (normally closed valve type) valve device together with an electromagnetic drive portion. Further, as long as the intake valve device configures a normally closed type valve device, there is no need to provide the electromagnetic drive portion.

In another embodiment of the present disclosure, the pulsation damper may not be installed inside the cover. Further, the cover may not be provided. In the case of the configuration without the cover member, it is conceivable to directly supply the fuel to the intake passage of the pump body.

In another embodiment of the present disclosure, the high-pressure pump may be used as a fuel pump that discharges the fuel toward a device or the like other than the engine of the vehicle. As described above, the present disclosure is not limited to the above embodiments, but can be implemented in various configurations without departing from the spirit of the present invention.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A high-pressure pump comprising:
a pump body including a pressurizing chamber that pressurizes a fuel, and a discharge passage through which the fuel pressurized and discharged by the pressurizing chamber flows;
a valve seat portion that includes a valve seat main body which is provided in the discharge passage to partition the discharge passage into a first space positioned between the valve seat main body and the pressurizing chamber and a second space positioned on an opposite side of the valve seat main body from the pressurizing chamber, a discharge valve passage which is provided in the valve seat main body and connects the first space and the second space, a relief valve passage which is provided in the valve seat main body and connects the second space and the first space without communicating with the discharge valve passage, a discharge valve seat having an annular shape and surrounding an opening of the discharge valve passage of the valve seat main body in the second space, and a relief valve seat having an annular shape and surrounding an opening of the relief valve passage of the valve seat main body in the first space;
a discharge valve member provided in the second space to be capable of contacting the discharge valve seat, the discharge valve member opening or closing the discharge valve passage when separating from the discharge valve seat or contacting the discharge valve seat;
a discharge valve urging member urging the discharge valve member toward the discharge valve seat;
a relief valve member provided in the first space to be reciprocable in an axial direction, the relief valve member including a relief valve main body having a rod shape, and
a relief valve seat portion which is integrated with a first end of the relief valve main body in the axial direction and is capable of contacting the relief valve seat;
a relief valve urging member urging the relief valve member toward the relief valve seat;
a support portion including a support main body provided in the first space, and a guide hole portion connecting a surface of the support main body facing the pressurizing chamber and a surface of the support main body facing the valve seat portion, the relief valve main body being inserted into the guide hole portion, the support portion slidably supporting an outer wall of the relief valve main body by the guide hole portion to guide reciprocating movement of the relief valve member in the axial direction; and
a fuel guide portion that is provided on an end portion of the relief valve main body facing the pressurizing chamber and is capable of guiding a flow of the fuel in a direction radially outward of the relief valve main body on the way from the pressurizing chamber to the valve seat portion
wherein the fuel guide portion includes a first specific shape portion having an outer wall which increases in its distance from an axis of the fuel guide portion along a direction from the pressurizing chamber toward the valve seat portion, and a second specific shape portion disposed between the valve seat portion and the first specific shape portion, the second specific shape portion having an outer wall which increases in its distance from the axis along the direction from the pressurizing chamber toward the valve seat portion, and a first angle between a first virtual straight line extending along the outer wall of the first specific shape portion and the axis is different from a second angle between a second virtual straight line extending along the outer wall of the second specific shape portion and the axis.

2. The high-pressure pump according to claim 1, wherein the guide hole portion of the support portion slidably supports the outer wall of the relief valve main body at a second end of the relief valve main body in the axial direction.

3. The high-pressure pump according claim 1, wherein the fuel guide portion has a third specific shape portion that connects the first specific shape portion and the second specific shape portion.

4. The high-pressure pump according to claim 3, wherein an outer wall of the third specific shape portion is curved in a cross sectional plane which is a virtual plane including the axis of the fuel guide portion.

5. The high-pressure pump according to claim 1, wherein the fuel guide portion is integrated with the relief valve main body.

6. The high-pressure pump according to claim 1, wherein the fuel guide portion is separate from the relief valve main body.

7. The high-pressure pump according to claim 1, wherein a largest outer diameter of the fuel guide portion is smaller than an inner diameter of the guide hole portion.

8. The high-pressure pump according to claim 1, wherein a largest outer diameter of the fuel guide portion is equal to or larger than an inner diameter of the guide hole portion.

9. The high-pressure pump according to claim 1, wherein
the valve seat portion includes a valve seat cylinder portion extending in a cylindrical shape from the valve seat main body toward the first space, and
the support portion includes a support cylinder portion extending in a cylindrical shape from the support main body toward the second space and being fitted to an inner wall or an outer wall of the valve seat cylinder portion.

10. A high-pressure pump comprising:
a pump body including a pressurizing chamber that pressurizes a fuel, and a discharge passage through which the fuel pressurized and discharged by the pressurizing chamber flows;
a valve seat portion that includes a valve seat main body which is provided in the discharge passage to partition the discharge passage into a first space positioned between the valve seat main body and the pressurizing chamber and a second space positioned on an opposite side of the valve seat main body from the pressurizing chamber, a discharge valve passage which is provided in the valve seat main body and connects the first space and the second space, a relief valve passage which is provided in the valve seat main body and connects the second space and the first space without communicating with the discharge valve passage, a discharge valve seat having an annular shape and surrounding an opening of the discharge valve passage of the valve seat main body in the second space, and a relief valve seat having an annular shape and surrounding an opening of the relieve valve passage of the valve seat main body in the first space;
a discharge valve member provided in the second space to be capable of contacting the discharge valve seat, the discharge valve member opening or closing the discharge valve passage when separating from the discharge valve seat or contacting the discharge valve seat;
a discharge valve urging member urging the discharge valve member toward the discharge valve seat;
a relief valve member provided in the first space to be reciprocable in an axial direction, the relief valve member including a relief valve main body having a rod shape, and a relief valve seat portion which is integrated with a first end of the relief valve main body in the axial direction and is capable of contacting the relief valve seat;
a relief valve urging member urging the relief valve member toward the relief valve seat;
a support portion including a support main body provided in the first space, and a guide hole portion connecting a surface of the support main body facing the pressurizing chamber and a surface of the support main body facing the valve seat portion, the relief valve main body being inserted into the guide hole portion, the support portion slidably supporting an outer wall of the relief valve main body by the guide hole portion to guide reciprocating movement of the relief valve member in the axial direction; and
a fuel guide portion that is provided on an end portion of the relief valve main body facing the pressurizing chamber and is capable of guiding a flow of the fuel in a direction radially outward of the relief valve main body on the way from the pressurizing chamber to the valve seat portion, wherein
the fuel guide portion includes a first specific shape portion having an outer wall which increases in its distance from an axis of the fuel guide portion along a direction from the pressurizing chamber toward the valve seat portion, and a second specific shape portion disposed between the valve seat portion and the first specific shape portion, the second specific shape portion having an outer wall which increases in its distance from the axis along the direction from the pressurizing chamber toward the valve seat portion, and
the outer walls of the first specific shape portion and the second specific shape portion of the fuel guide portion have shapes along a part of a circle or a part of an ellipse in a cross sectional plane which is a virtual plane including the axis.

11. The high-pressure pump according to claim 10, wherein a first angle between a first virtual straight line extending along the outer wall of the first specific shape portion and the axis is different from a second angle between a second virtual straight line extending along the outer wall of the second specific shape portion and the axis.

12. A high-pressure pump comprising:
a pump body including a pressurizing chamber that pressurizes a fuel, and a discharge passage through which the fuel pressurized and discharged by the pressurizing chamber flows;
a valve seat portion that includes a valve seat main body which is provided in the discharge passage to partition the discharge passage into a first space positioned between the valve seat main body and the pressurizing chamber and a second space positioned on an opposite side of the valve seat main body from the pressurizing chamber, a discharge valve passage which is provided in the valve seat main body and connects the first space and the second space, a relief valve passage which is provided in the valve seat main body and connects the second space and the first space without communicating with the discharge valve passage, a discharge valve seat having an annular shape and surrounding an opening of the discharge valve passage of the valve seat main body in the second space, and a relief valve seat having an annular shape and surrounding an opening of the relieve valve passage of the valve seat main body in the first space;

a discharge valve member provided in the second space to be capable of contacting the discharge valve seat, the discharge valve member opening or closing the discharge valve passage when separating from the discharge valve seat or contacting the discharge valve seat;

a discharge valve urging member urging the discharge valve member toward the discharge valve seat;

a relief valve member provided in the first space to be reciprocable in an axial direction, the relief valve member including a relief valve main body having a rod shape, and a relief valve seat portion which is integrated with a first end of the relief valve main body in the axial direction and is capable of contacting the relief valve seat;

a relief valve urging member urging the relief valve member toward the relief valve seat;

a support portion including a support main body provided in the first space, and a guide hole portion connecting a surface of the support main body facing the pressurizing chamber and a surface of the support main body facing the valve seat portion, the relief valve main body being inserted into the guide hole portion, the support portion slidably supporting an outer wall of the relief valve main body by the guide hole portion to guide reciprocating movement of the relief valve member in the axial direction; and a fuel guide portion that is provided on an end portion of the relief valve main body facing the pressurizing chamber and is capable of guiding a flow of the fuel in a direction radially outward of the relief valve main body on the way from the pressurizing chamber to the valve seat portion, wherein the fuel guide portion is separate from the relief valve main body, and a largest outer diameter of the fuel guide portion is equal to or larger than an inner diameter of the guide hole portion.

13. The high-pressure pump according to claim 12, wherein the fuel guide portion includes a first specific shape portion having an outer wall which increases in its distance from an axis of the fuel guide portion along a direction from the pressurizing chamber toward the valve seat portion, and a second specific shape portion disposed between the valve seat portion and the first specific shape portion, the second specific shape portion having an outer wall which increases in its distance from the axis along the direction from the pressurizing chamber toward the valve seat portion.

* * * * *